United States Patent
Hull et al.

(10) Patent No.: US 7,771,183 B2
(45) Date of Patent: Aug. 10, 2010

(54) SOLID IMAGING SYSTEM WITH REMOVAL OF EXCESS UNCURED BUILD MATERIAL

(75) Inventors: Charles W. Hull, Santa Clarita, CA (US); Jouni Partanen, Palo Alto, CA (US); Ray Soliz, Escondido, CA (US); William J. Pappas, San Luis Obispo, CA (US)

(73) Assignee: 3D Systems, Inc., Rock Hill, SC (US)

( * ) Notice: Subject to any disclaimer, the term of this patent is extended or adjusted under 35 U.S.C. 154(b) by 177 days.

(21) Appl. No.: 11/856,378

(22) Filed: Sep. 17, 2007

(65) Prior Publication Data

US 2008/0206383 A1 Aug. 28, 2008

Related U.S. Application Data

(60) Provisional application No. 60/885,254, filed on Jan. 17, 2007, provisional application No. 60/885,257, filed on Jan. 17, 2007, provisional application No. 60/949,614, filed on Jul. 13, 2007, provisional application No. 60/956,051, filed on Aug. 15, 2007, provisional application No. 60/956,118, filed on Aug. 15, 2007.

(51) Int. Cl.
*B28B 1/16* (2006.01)
*B29C 37/00* (2006.01)
*B29B 17/00* (2006.01)

(52) U.S. Cl. ............ 425/215; 425/375; 425/174.4; 425/90; 264/113; 264/308; 264/497

(58) Field of Classification Search .............. 425/174.4, 425/375, 218, 215; 264/113, 308, 401, 497; 118/641, 257

See application file for complete search history.

(56) References Cited

U.S. PATENT DOCUMENTS 4,752,498 A 6/1988 Fudim (Continued)

FOREIGN PATENT DOCUMENTS

DE 4430374 4/1995

(Continued)

OTHER PUBLICATIONS

U.S. Appl. No. 11/856,405, filed Sep. 17, 2007.

(Continued)

*Primary Examiner*—Maria Veronica D Ewald
(74) *Attorney, Agent, or Firm*—William Simons; Keith A. Roberson

(57) ABSTRACT

Solid imaging apparatus and methods for use are disclosed that reduce the amount of uncured solid imaging build material remaining on a completed build object following the completion of the solid imaging build process. The amount of uncured build material is reduced through the use of either an uncoating web that removes excess build material from the build object during the course of the building process or an ink jet source of build material that uses only as much build material as is necessary for the fabrication of the build part. Also disclosed is an imager assembly for use with such a solid imaging apparatus that incorporates two or more individual imagers in an array and accounts for variations in the intensity and alignment of adjacent imagers. The apparatus can be modified for semi-continuous operation and for integrating into a manufacturing operation, if desired.

25 Claims, 28 Drawing Sheets

U.S. PATENT DOCUMENTS

| | | | |
|---|---|---|---|
| 5,014,207 A | 5/1991 | Lawton | |
| 5,049,901 A | 9/1991 | Gelbart | |
| 5,094,935 A | 3/1992 | Vassiliou et al. | |
| 5,096,530 A | 3/1992 | Cohen | |
| 5,122,441 A | 6/1992 | Lawton et al. | |
| 5,132,723 A | 7/1992 | Gelbart | |
| 5,143,817 A | 9/1992 | Lawton et al. | |
| 5,158,858 A | 10/1992 | Lawton et al. | |
| 5,169,579 A | 12/1992 | Marcus et al. | |
| 5,171,490 A | 12/1992 | Fudim | |
| 5,192,559 A | 3/1993 | Hull et al. | |
| 5,204,823 A * | 4/1993 | Schlotterbeck | 700/120 |
| 5,236,812 A | 8/1993 | Vassiliou et al. | |
| 5,238,614 A * | 8/1993 | Uchinono et al. | 264/401 |
| 5,247,180 A | 9/1993 | Mitcham et al. | |
| 5,306,446 A | 4/1994 | Howe | |
| 5,391,072 A | 2/1995 | Lawton et al. | |
| 5,429,908 A | 7/1995 | Hokuf et al. | |
| 5,447,822 A | 9/1995 | Hull et al. | |
| 5,474,719 A | 12/1995 | Fan et al. | |
| 5,529,473 A | 6/1996 | Lawton et al. | |
| 5,530,221 A * | 6/1996 | Benda et al. | 219/121.83 |
| 5,626,919 A * | 5/1997 | Chapman et al. | 427/510 |
| 5,650,260 A | 7/1997 | Onishi | |
| 5,695,708 A | 12/1997 | Karp et al. | |
| 6,051,179 A | 4/2000 | Hagenau | |
| 6,174,156 B1 | 1/2001 | Chapman et al. | |
| 6,206,672 B1 | 3/2001 | Grenda | |
| 6,391,245 B1 | 5/2002 | Smith | |
| 6,500,378 B1 | 12/2002 | Smith | |
| 6,547,552 B1 | 4/2003 | Fudim | |
| 6,554,600 B1 * | 4/2003 | Hofmann et al. | 425/174.4 |
| 6,641,772 B2 | 11/2003 | Gelbart | |
| 6,665,048 B2 | 12/2003 | Gelbart | |
| 6,733,267 B2 | 5/2004 | Chapman et al. | |
| 6,792,327 B1 | 9/2004 | Bamford | |
| 6,824,714 B1 | 11/2004 | Turck et al. | |
| 6,932,935 B1 | 8/2005 | Oberhofer et al. | |
| 6,942,830 B2 | 9/2005 | Mulhaupt et al. | |
| 6,965,364 B1 | 11/2005 | Eggers et al. | |
| 7,052,263 B2 | 5/2006 | John | |
| 7,090,484 B2 | 8/2006 | Ueno | |
| 7,128,866 B1 | 10/2006 | Henningsen | |
| 7,158,849 B2 | 1/2007 | Huang et al. | |
| 2001/0045678 A1 * | 11/2001 | Kubo et al. | 264/37.29 |
| 2002/0153640 A1 | 10/2002 | John | |
| 2003/0021823 A1 | 1/2003 | Landers et al. | |
| 2004/0265413 A1 | 12/2004 | Russell et al. | |
| 2005/0208168 A1 | 9/2005 | Hickerson et al. | |
| 2005/0248061 A1 * | 11/2005 | Shkolnik et al. | 264/401 |
| 2005/0248062 A1 | 11/2005 | Shkolnik et al. | |
| 2005/0263934 A1 * | 12/2005 | Chung et al. | 264/113 |
| 2006/0223901 A1 | 10/2006 | Xu | |
| 2006/0239588 A1 | 10/2006 | Hull et al. | |
| 2006/0249884 A1 | 11/2006 | Partanen et al. | |
| 2007/0063389 A1 | 3/2007 | John | |
| 2007/0257055 A1 | 11/2007 | Scott et al. | |
| 2007/0259066 A1 | 11/2007 | Sperry et al. | |

FOREIGN PATENT DOCUMENTS

| | | |
|---|---|---|
| DE | 19957370 A1 | 11/1999 |
| DE | 10119817 A1 | 10/2002 |
| DE | 10256672 A1 | 6/2004 |
| EP | 0322257 | 6/1989 |
| EP | 0470705 | 2/1992 |
| EP | 0676275 | 10/1995 |
| EP | 549993 B1 | 3/1997 |
| EP | 676275 B1 | 7/2000 |
| EP | 1253002 A1 | 10/2002 |
| EP | 1439051 A2 | 7/2004 |
| EP | 1439052 A2 | 7/2004 |
| EP | 1274559 B1 | 2/2005 |
| EP | 1250997 B1 | 11/2005 |
| EP | 1600282 | 11/2005 |
| EP | 1719607 | 11/2006 |
| EP | 1864785 | 2/2007 |
| JP | 2002370286 A | 12/2002 |
| JP | 6039928 A | 12/2007 |
| WO | WO-0236331 | 5/2002 |
| WO | WO-2006/109425 | 10/2006 |

OTHER PUBLICATIONS

U.S. Appl. No. 11/856,428, filed Sep. 17, 2007.
U.S. Appl. No. 11/856,455, filed Sep. 17, 2007.
U.S. Appl. No. 11/856,172, filed Sep. 17, 2007.
U.S. Appl. No. 11/856,183, filed Sep. 17, 2007.
U.S. Appl. No. 11/856,225, filed Sep. 17, 2007.
U.S. Appl. No. 11/856,209, filed Sep. 17, 2007.
U.S. Appl. No. 11/856,241, filed Sep. 17, 2007.
U.S. Appl. No. 11/856,270, filed Sep. 17, 2007.
U.S. Appl. No. 11/468,090, filed Aug. 29, 2006.
PCT Search Report for International Application No. PCT/US2007/087715.
PCT Search Report for International Application No. PCT/US2007/087716.
PCT Search Report for International Application No. PCT/US2007/087718.
PCT Search Report for International Application No. PCT/US2007/087720.
English Translation of DE 19957370A1, published Jun. 2001.
European Search Report for European Application No. EP 08000399.9.

* cited by examiner

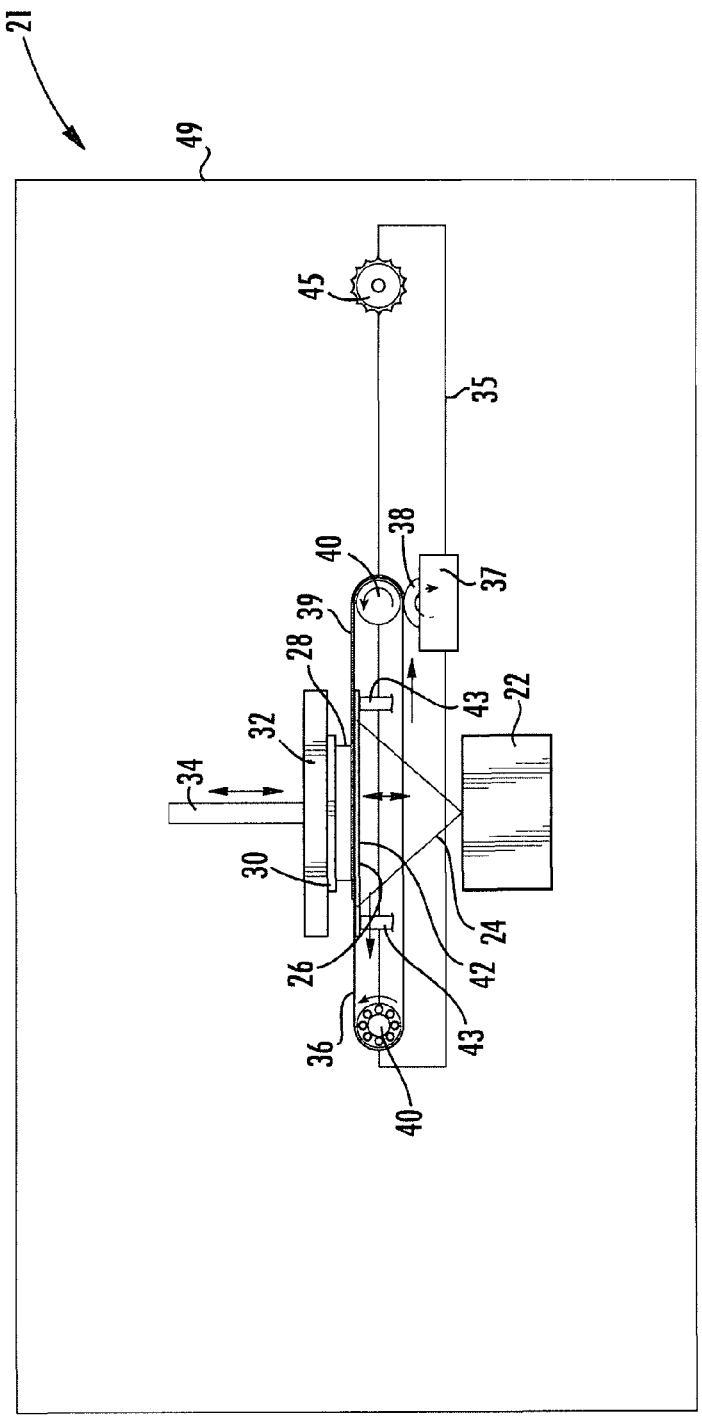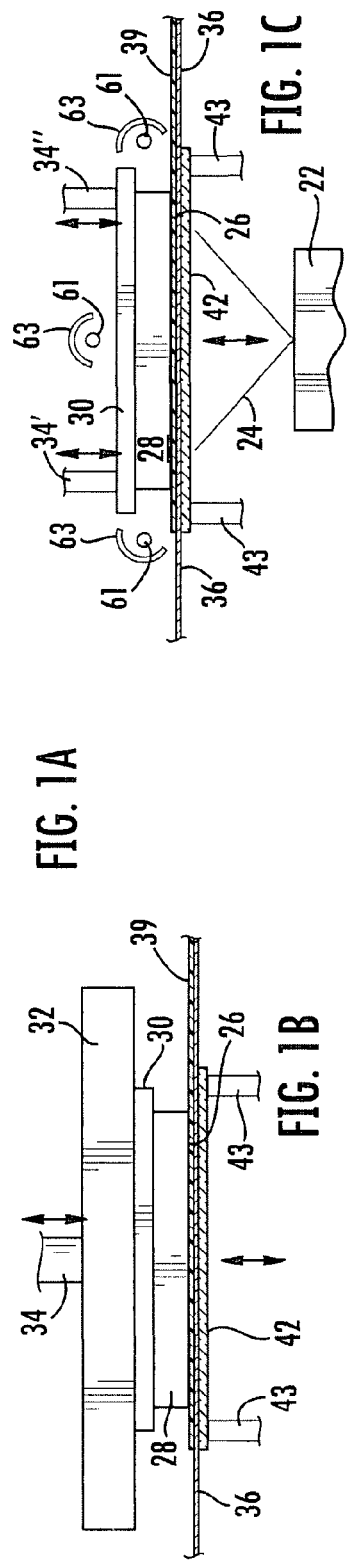

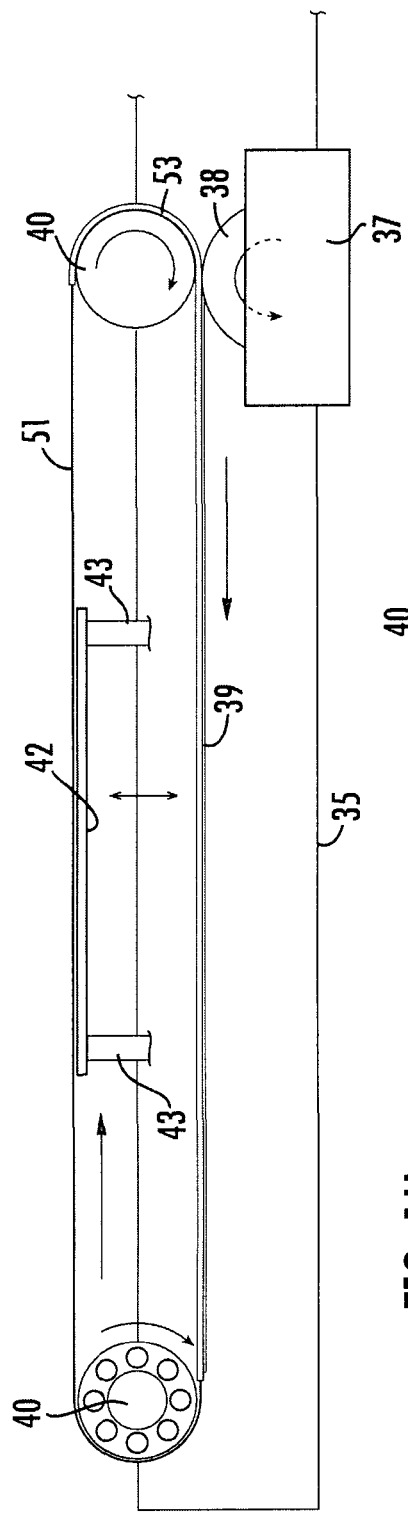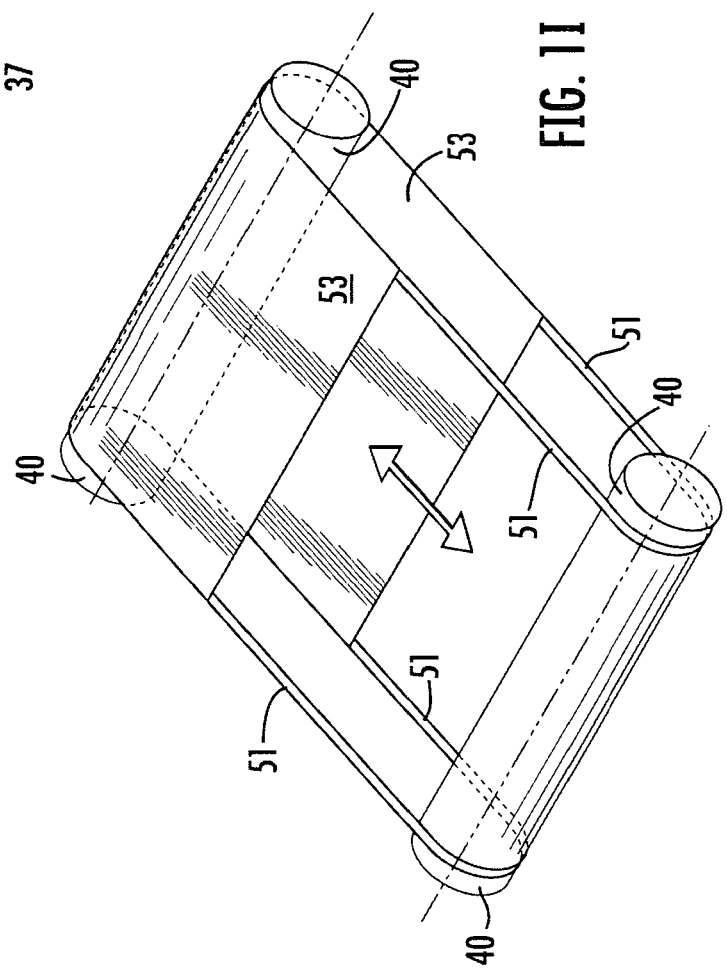
FIG. 1H
FIG. 1I

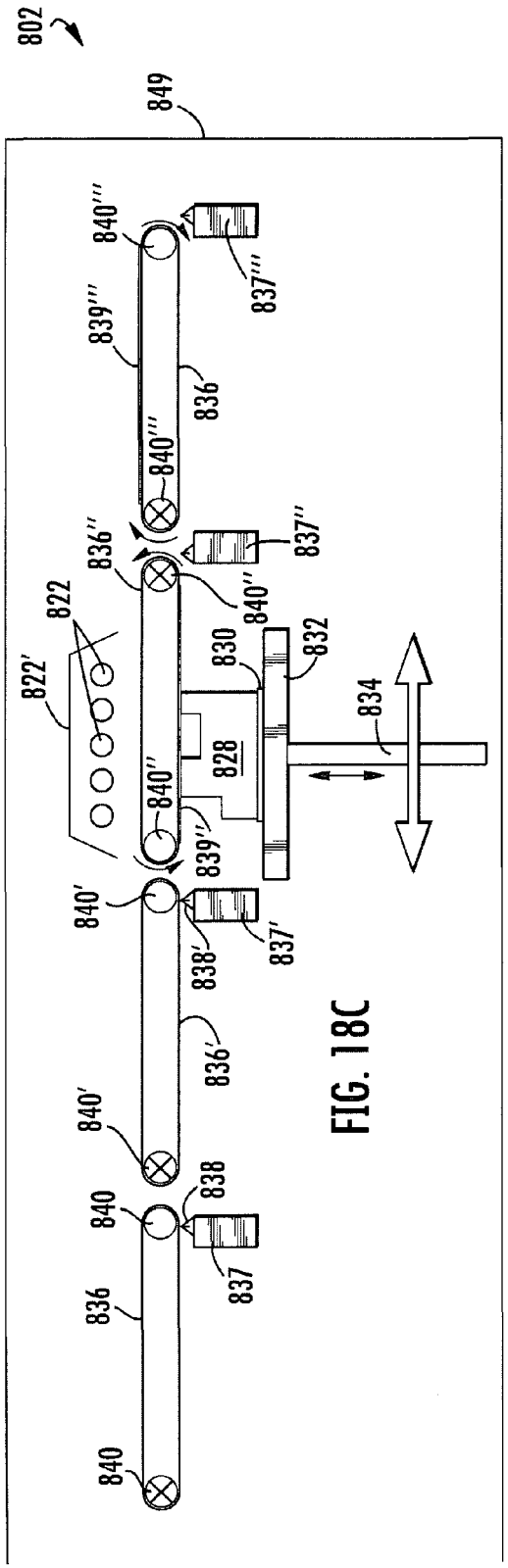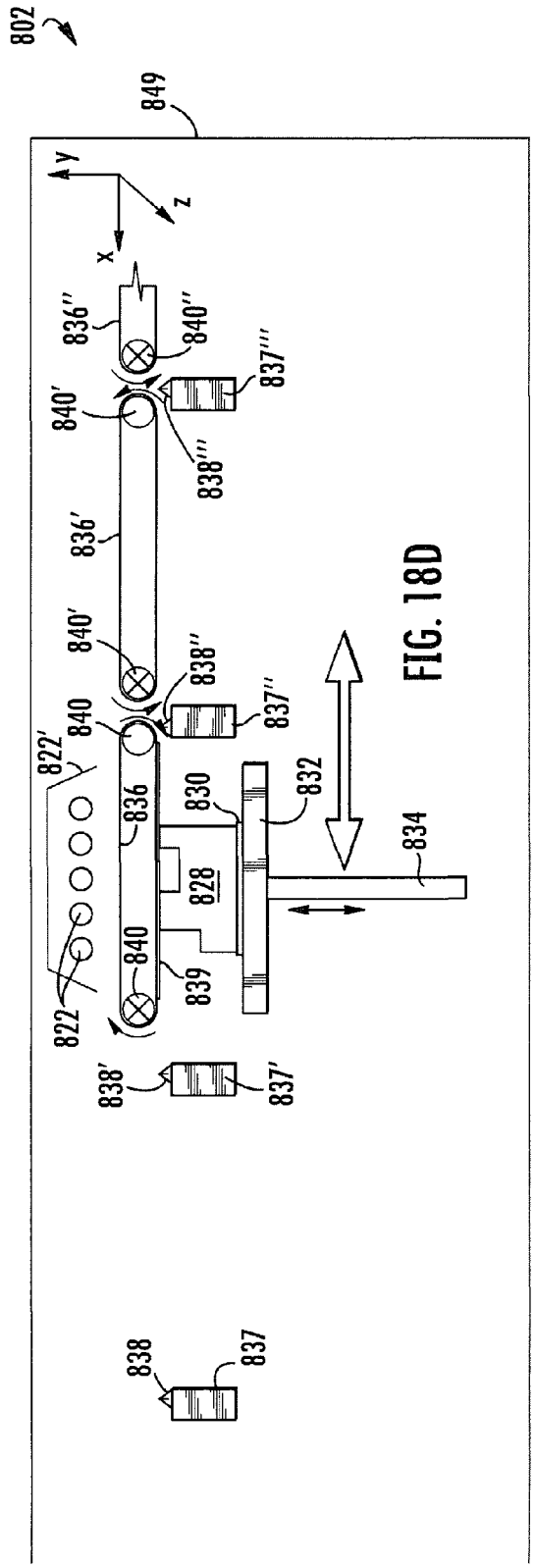

a solid imaging product. More recent developments include flexible transport solid imaging devices and methods that are capable of using visible and ultraviolet light sources to irradiate build materials responsive to these wavelengths.

SOLID IMAGING SYSTEM WITH REMOVAL OF EXCESS UNCURED BUILD MATERIAL

CROSS-REFERENCE TO RELATED APPLICATIONS

This application claims priority from Non-provisional application Ser. No. 11/096,748 filed Apr. 1, 2005 for "Edge Smoothness with Low Resolution Projected Images for Use in Solid Imaging;" Non-provisional application Ser. No. 11/121,348 filed May 3, 2005 for "Bubble-free Cross-sections for Use in Solid Imaging;" Non-provisional application Ser. No. 11/375,917 filed Mar. 15, 2006 for "Bubble-free Cross-sections for Use in Solid Imaging;" Non-provisional application Ser. No. 11/468,090 filed Aug. 29, 2006 for "Improved Wall Smoothness;" Provisional Application Ser. No. 60/885,254 filed Jan. 17, 2007 for "Coat and Un-coat Flex Transport System; Provisional Application Ser. No. 60/885,257 filed Jan. 17, 2007 for "Solid Imaging Apparatus and Method Including: Cartridge for Solid Imaging Apparatus; Method for Conveying Build Material Layer-By-Layer; Elevator for Tilting Solid Image Build Platform for Reducing Air Entrainment and for Consistent Repeatable Alignment in a Solid Imaging Apparatus;" Provisional Application Ser. No. 60/949,614 filed Jul. 13, 2007 for "Solid Imaging Apparatus and Method Including: Cartridge for Solid Imaging Apparatus; Method for Conveying Build Material Layer-by-Layer; Elevator for Tilting Solid Image Build Platform for Reducing Air Entrainment and for Build Release; Build Platform, Solid Image, and Method for Solid Imaging; Imager and Method for Consistent Repeatable Alignment in a Solid Imaging Apparatus; Eccentric Reciprocating Brush and Method for Reducing Overbuild; Provisional Application Ser. No. 60/956,051 filed Aug. 15, 2007 for "Solid Imaging Apparatus and Method Including: Cartridge for Solid Imaging Apparatus; Method for Conveying Build Material Layer-By-Layer; Elevator for Tilting Solid Image Build Platform for Reducing Air Entrainment and for Build Release; Build Platform, Solid Image, and Method for Solid Imaging; Imager and Method for Consistent Repeatable Alignment in a Solid Imaging Apparatus; and Intra-Layer Cleaning Assembly and Method for Removing Excess Uncured Build Material;" and Provisional Application Ser. No. 60/956,118 filed Aug. 15, 2007 for "Solid Imaging System; and the contents of which are incorporated herein by reference in their entirety.

FIELD OF THE INVENTION

The invention relates generally to the field of solid imaging and to apparatus and methods for creating three-dimensional solid objects through the layer-by-layer build-up of radiation-solidifiable photopolymer build materials.

BACKGROUND

Solid imaging devices fabricate three-dimensional objects from fusible powders or photocurable liquids, typically by exposure to radiation. Powders and liquids for solid imaging sometimes are referred to as "build materials" and the three-dimensional objects produced by solid imaging devices sometimes are called "builds," "parts," and "solid imaging products," which can include a wide variety of shapes. Solid imaging includes many devices and methods to create three-dimensional objects, including by stereolithography, laser sintering, inkjet printing, and similar methods, which typically employ a layer-by-layer fabrication method. A laser or other source of radiation sequentially irradiates individual thin layers of the build material in response to which the material transforms to a solid, layer-upon-layer, to create a solid imaging product. More recent developments include flexible transport solid imaging devices and methods that are capable of using visible and ultraviolet light sources to irradiate build materials responsive to these wavelengths.

Despite the variety of devices and methods developed for solid imaging, a number of drawbacks have yet to be resolved. Typically, solid imaging devices produce products in batches rather than continuously or semi-continuously. Solid imaging devices produce "green" three-dimensional products, in which uncured build material wets the surface and causes the product to be tacky and to require cleaning prior to fully curing the product throughout the build.

Another drawback of many solid imaging devices is the limitation on the size of the objects that can be built. For machines that use a laser as the radiation source for transformation of build material, the time required to build the object is directly related to the object's size because of limitations on the speed with which a laser can scan the surface of the cross-section. Laser scanners can be provided with higher resolution capabilities and with a large size laser spot for scanning larger areas at once, completing borders and fine details with a smaller spot, but the scanning speed remains significantly slower than that which can be achieved with a digital light processing ("DLP") imager.

DLP imagers employ mirror arrays in which selective control of each individual mirror between "on" and "off" positions produces the desired image in a fresh layer of photocurable build material. Each individual mirror correlates to a pixel, which is the smallest element of an image that can be individually processed in a display system for a two-dimensional image. DLP's and high resolution laser scanners have comparable minimum feature sizes. Imaging speed increases with a DLP as compared to a laser scanner because the individual mirrors in the DLP array can be controlled simultaneously to image an area of the build at one time, including an entire layer of a build, rather than by using a scanner to trace the image with a laser spot.

Systems using a DLP imager to produce larger objects have limitations. For larger objects, the DLP imager spreads the available radiation energy over a larger area, increasing the exposure time and reducing the resolution of the image. Commonly available imagers having a mirror array of 1024×768 pixels can expose a 9×6.75 inch area (22.9×17.14 cm area) in about 5 seconds and produce fine detail similar to that of a laser scanner. Increasing the image area to 18×13.5 inches (45.7×34.3 cm) increases exposure time to about 20 seconds and reduces fine detail twofold.

Image dimensions can be increased by 37% with the same minimum feature size by replacing a DLP having a 1024×768 pixel array with a higher resolution DLP having a 1400×1024 pixel array. That is to say, the same object could be produced with the same detail in a 12.2×9 inch format (31.0×22.9 cm format) with the larger array compared to the 9×6.75 inch format (22.9×17.14 cm format) of the smaller array. Nevertheless, higher resolution DLP imagers do not resolve the problems of increased exposure time and reduced detail for larger objects. The larger array reduces image intensity by 45% and increases exposure time from 5 to 9.1 seconds, which is significant over the course of a build.

Within limits, it should be possible to use higher intensity light sources with larger arrays to resolve some of the issues, but ever larger imagers and higher intensity light sources can be problematic to adapt for use in solid imaging devices. It would be desirable to improve the efficiency of solid imaging devices and methods and to produce three-dimensional objects in greater variety and with fewer restrictions.

SUMMARY

The invention relates to solid imaging apparatus and methods for providing three-dimensional objects with greater efficiency. In some embodiments, the invention provides builds that require less processing after the build is completed, either in its green state or fully cured. The invention includes in selected embodiments, if desired, one or more of the added capabilities of producing builds in either batch or semi-continuous mode in a tack free or nearly tack free condition, fully curing the builds, and producing builds with equivalent or better feature detail and in larger sizes than presently available. The apparatus and method of the invention can be incorporated into downstream manufacturing processes.

The apparatus of the invention provides a source of radiation for solid imaging, one or more sources of solid imaging build material remote from a defined image plane, and at least one reciprocating transport surface that conveys build material layer-by-layer to the image plane from the one or more sources of build material. The build material typically will be a flowable material that easily can be transferred to the transport surface. The source of radiation hardens the layer of build material in the image plane. The radiation source emits light over a range of wave lengths to which the build material is responsive, typically visible and ultra-violet light.

The image plane defines a surface in space for transforming the build material layer-by-layer to form the solid imaging product. A surface for retaining the solid imaging product cooperates with a source of radiation and at least one transport surface to create the image plane. The radiation source transforms the build material layer-by-layer into a solid built on the retaining surface.

In a first more specific embodiment, the source of build material applies a layer of the build material to the reciprocating transport surface in the image of the build layer and prior to transformation of the image into a cured layer on a build surface. In this embodiment, substantially no uncured build material remains on the build surface or on the transport surface after irradiation of the image. Since the source of build material, typically an ink jet print head, produces the image, uncured build material need not normally be removed. Multiple reciprocating transport surfaces and sources of build material provide efficient solid imaging of builds from multiple build materials. Typically, at least two reciprocating transport surfaces will be used in tandem about a centrally located image plane for faster builds, each depositing build material images that are then solidified, one after the other.

In a second more specific embodiment, the source of build material provides a layer of build material to the at least one reciprocating transport surface and the radiation source cures that portion of the layer corresponding to the desired image. For example, a gravure roll may pick up a layer of build material from a reservoir and contact the transport surface to apply a layer of the material to the transport surface. The radiation source illuminates in response to a controller that portion of the build material layer on the transport surface corresponding to the desired image. Uncured build material may adhere to the build and an additional transport surface may be provided for transporting away from the image plane uncured build material that remains after imaging the build material at the image plane.

Thus, additional embodiments include more than one transport surface, whether for transporting build material to or from the build and multiple sources of build material. These transport surfaces move relative to the radiation source and the retaining surface for the build in tandem as a unit and each reciprocates opposite the unit movement to reduce relative motion between the build surface and the transport surfaces. Additional sets of transport surfaces may be located in parallel, the parallel sets traveling transverse to the direction of travel of the surfaces for seriatim engagement of the cooperating radiation source and retaining surface. Each of these transport surfaces can be made disposable or reusable, as desired.

The reciprocating transport surface for transporting build material to the image plane typically comprises a flexible polymeric film prepared for ready pick-up, delivery, and transfer of build material to the image platform. This transport surface in one embodiment is configured to reciprocate around a drive mechanism with the two ends of the surface joined by cables, one cable located adjacent each edge of the surface so as not to interfere with transmission of radiation.

The transport surface for transporting the build material away from the image plane typically comprises an uncoating surface. This uncoating surface in one embodiment comprises a brush operated in a reciprocating fashion to contact the build and remove excess uncured build material. In another embodiment, the uncoating surface is an endless belt that can be operated either in a reciprocating or rotating fashion, so long as the direction and speed of travel are controlled to reduce or substantially preclude relative motion between the build surface and the transport surface. Alternatively, this transport surface can be configured similarly to that for conveying build material to the image plane, if desired. Absorbent materials useful for the transport surface include a web of cotton or other absorbent fiber, including paper or nonwoven thermoplastic polymers suitable for ready pick-up of uncured build material from the build surface. The transport surface for removing build material may be dabbed onto the surface of the build multiple times if necessary to remove sufficient uncured build material. The uncured build material removed from the build can be recovered from the transport surface for re-use or disposed of, as desired. If desired, the transport surface and the uncured build material can be disposed of together and the transport surface replaced.

When an imager provides the radiation source, the image size can be increased by aligning multiple imagers for simultaneous imaging. Aligned multiple imagers expand the size of the image plane beyond that of a single imager by adjustments to reduce the variations between imagers at the boundaries of the images projected by each individual imager. In this way, the imaging system increases the size of the builds by enabling simultaneous imaging of separate portions of a combined area as one image, without moving the imager.

Each imager exposes a portion of the build area at the image plane to create a total image area. The separate imagers produce a unified total image area by the steps of segmenting the total image area according to the imager producing the portion of the image and controlling exposure at the seams where the image portions join up to blend the pixels at the seams. The method produces a total image area without increasing minimum feature size and without reducing radiation power density as compared to a single imager.

Considering blending the pixels at the seams in somewhat more detail, to create large objects having desirable minimum feature sizes and without reducing radiation power density requires precisely aligning at least two or more imagers along the edges of each image area that have seams between the image areas. Overlapping the image areas by a small amount along the edges and adjusting magnification of each imager to line the pixels up at the seams allows the next step of determining the pixel blending characteristics at the seams. The amount of pixel overlap at the seams determines how much to reduce the pixel intensity at the seams. Adjusting the gray scale of the pixels at the seams allows correction of border positions of the crossing pixels at the seams. Border positions can also be corrected by adjusting exposure time of border pixels, if desired. Thus, the apparatus of the invention allows production of three-dimensional objects by a solid imaging procedure in which the products have large cross-sections without the expense or time previous devices would require.

In additional embodiments, the apparatus and method of the invention may include additional transport surfaces or sources of build material, or both, to provide builds from multiple build materials. Carriages can include pairs of transport surfaces coated with build material from different sources for application to a single build. Transport surfaces for removing uncured build material can be placed as needed for removing the uncured material from the build surface. Gang assemblies of parallel carriages can apply build material sequentially to an image plane, each assembly having at least one reciprocating transport surface, although typically two or more. Controlling the sequence of application provides that the support material can be different from the build or that the build may comprise layers or portions of layers from different components as are sometimes required for composite material structures, including biomedical structures.

Semicontinuous embodiments provide an endless indexing surface, typically mounted perpendicular to the direction of travel of the transport surface, to provide a continuous build platform held stationary while a build is completed and then indexed to provide a fresh build platform surface for the next build. This embodiment can provide, if desired, a surface for transport of multiple builds to stations outside the solid imaging device for downstream processing, including fully curing throughout the build. Other semi-continuous embodiments also provide pick and place systems for removing and replacing a discrete one-piece build platform to automate solid imaging production.

The method of the invention provides the steps of applying a fresh layer of build material to a reciprocating transport surface, transporting the fresh layer to the image plane to contact the build with the fresh layer of build material, and irradiating the build surface to cure the layer. In one specific embodiment, the step of applying a fresh layer of build material to a reciprocating transport surface includes imaging the layer onto the transport surface. In another embodiment that does not include this feature, the step of irradiating the build surface includes the step of imaging the build in the image plane. These embodiments may also include the step of removing remaining uncured build material, if any, from the imaged build before the next layer of fresh build material is applied to the build. A different transport surface from the reciprocating transport surface that transported the fresh layer of build material to the image plane contacts the build to remove uncured build material and transport the uncured material away from the image plane.

Thus, the invention provides, among other things, a flexible transport solid imaging device having reciprocating transport surfaces mounted in tandem on a reciprocating carriage and more than one source of build material. The invention also provides precise alignment of multiple imagers for scale-up in build size without losing features or increasing exposure time. The invention provides relatively tack-free builds in a wide variety of sizes with reduced post-build processing requirements. The invention can be adapted for semi-continuous operation by incorporating an indexing continuous build platform or automated removal and replacement of discrete build platforms with a pick and place system. The invention can be adapted for preparing builds of multiple materials by use of carriages including multiple transport surfaces and sources of build material. The invention provides, among other things, a semi-continuous flexible transport solid imaging device for larger, tack-free, fully cured solid images prepared from multiple build materials.

The foregoing and other advantages and features of the invention and the manner in which the same are accomplished will be more readily apparent upon consideration of the following detailed description of the invention taken in conjunction with the accompanying drawings, which illustrate preferred and exemplary embodiments.

BRIEF DESCRIPTION OF THE DRAWINGS

FIG. 1A is a schematic longitudinal plan view of one embodiment of the apparatus of the invention during the coating and imaging stage of the apparatus's operation and illustrating a reciprocating transport surface for coating and a rotating transport surface for uncoating;

FIG. 1B is an enlarged view of a portion of the apparatus shown in FIG. 1A;

FIG. 1C is an alternative embodiment of the enlarged portion of the apparatus shown in FIG. 1B;

FIG. 1H is an enlarged view of a portion of the apparatus shown in FIG. 1G;

FIG. 1I is a perspective view of a reciprocating transport surface for coating as shown in FIGS. 1A, 1F, 1G, and 1H;

FIGS. 18C and 18D are schematic longitudinal plan views in sequence of an embodiment of the invention similar to that of FIGS. 18A and 18B and having additional image transport surfaces;

Corresponding reference characters indicate corresponding parts throughout the several views of the drawings.

DETAILED DESCRIPTION

Figure 1D:
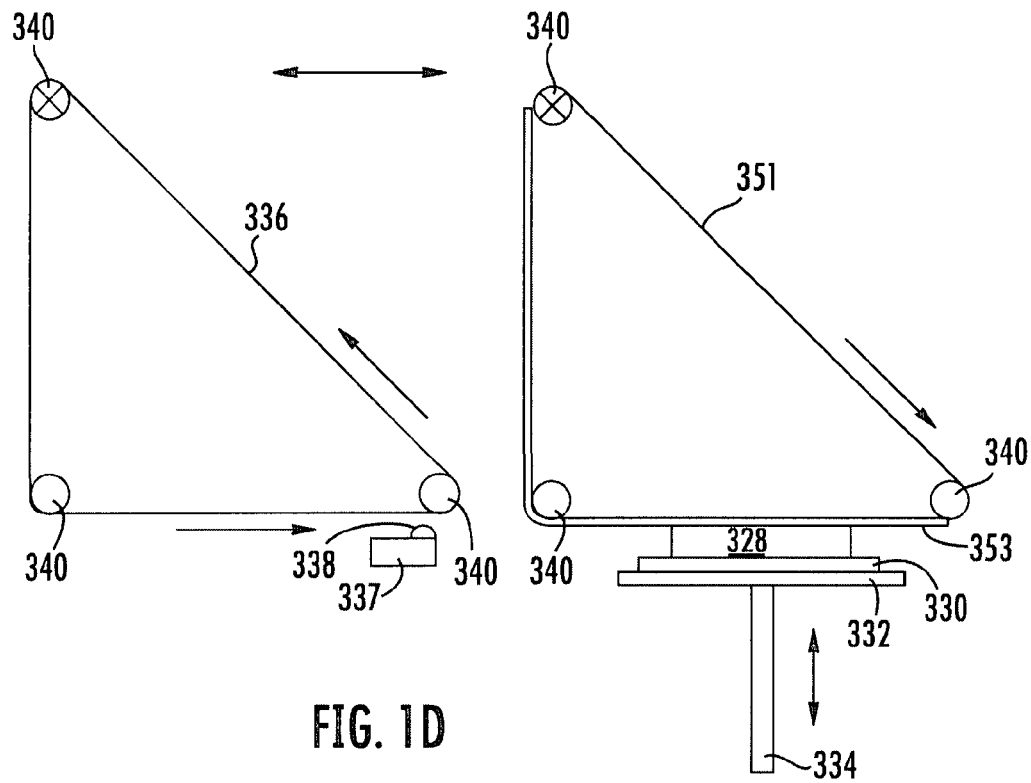
FIG. 1D is a schematic plan view of an alternative configuration of the embodiment of FIG. 1A.

The invention can be best understood with reference to the specific embodiments that are illustrated in the drawings and the variations described herein below. While the invention will be so described, it should be recognized that the invention is not intended to be limited to the embodiments illustrated in the drawings. On the contrary, the invention includes all alternatives, modifications, and equivalents that may be included within the spirit and scope of the invention as defined by the appended claims.

FIG. 1A shows generally at 21 a schematic longitudinal plan view of one embodiment of a flexible transport solid imaging device of the invention during the coating and imaging stage of its operation. FIG. 1B illustrates features of FIG. 1A enlarged for detail. A radiation source 22 provides focused solid imaging radiation 24 that is projected onto the build material-wetted surface 26 of a build 28 to cure selected portions of the fresh build material layer in an image plane. The build is a three dimensional object 28 that is being built incrementally, layer-by-layer. The image plane is a point in space defined by the intersection of the incremental layer of fresh build material with solid imaging radiation. When the build surface 26 is the correct distance from the radiation source, then the build surface 26 is in the image plane.

A build pad 30 supports the build on an elevator platform 32 driven by an elevator drive shaft 34, which locates the build surface in and out of the image plane to receive fresh build material and solid imaging radiation. A carriage frame 35 supports a build material transport surface 36 for conveying the build material layer-by-layer from a source thereof, reservoir 37. Carriage frame 35 may be any number of suitable devices for smooth and precise reciprocating movement between stopped positions, including, for example, a stepper motor driven lead screw or a DC motor capable of withstanding the torque encountered in moving the transport surface and reservoir assemblies. Transport surface 36 receivingly contacts gravure wheel 38 for application of a layer of build material 39 to the transport surface from reservoir 37 mounted on the carriage frame. The transport surface reciprocates about rollers 40, at least one of which serves as a drive roller, to pick up and transport build material to the image plane. The carriage 35 reciprocates in a direction opposite to the direction of travel of the transport surface to substantially eliminate relative motion between the transport surface and the build.

After the surface of the build is wetted, and prior to imaging, an optional image plane supporting plate 42 elevatingly mounted on drive shafts 43 may be used to push the transport surface into contact with the build surface, leveling and uniformly transmitting the fresh and uncured build material layer onto the build surface. The image plane supporting plate and related components are illustrated in an enlarged view in FIG. 1B. As illustrated, plate 42 is located one belt thickness away from the image plane at the wetted build surface, on the opposite side of the belt from the wetted build surface. The image plane supporting plate 42 and elevator drives 43 are mounted to the carriage 35 beneath the upper portion of the coating belt 36 opposite the wetted surface 39 of the belt for precisely setting the thickness of the build material over the build surface 26 after the belt has moved into the build position. Plate 42 transmits sufficient solid imaging radiation to transform the build material to a solid. Typically, the image plane supporting plate will be made of transparent glass or suitably transmissive plastics. Plate 42 is pulled away from the belt after the build material is exposed, before the belt is transported away from the build. It should be recognized that the apparatus can be operated in the absence of the plate 42 and driver 43 by maintaining sufficient tension in the belt to uniformly hold the build material to the surface of the build.

FIG. 1A also illustrates an uncoating surface for cleaning excess uncured build material from the surface of the build, which uncoating surface in FIG. 1a is device 45. Device 45 may be, in one embodiment, a brush mounted on the carriage 35 for reciprocating movement with the transport surface. As the carriage moves the transport surface to the left out from under the build, after deposition of a layer of build material onto the surface 26 of the build 28 and exposure of the surface to imaging radiation 24, the elevator lifts the build to the correct height for brush clearance and the carriage delivers the brush 45 to the build surface for contacting the build surface, either eccentrically or rotatingly to remove excess uncured build material. One suitable brush comprises a commercially available synthetic mohair roller of the type used to apply adhesives or paint. After the brush contacts the build to uncoat the build by removing excess uncured build material, the carriage reciprocates and the elevator is lowered to place the transport surface 36, coated with build material 39, into contact with the build for applying another layer of build material and continuing the build. The brush then would need to be cleaned such as by spinning the brush in a protective enclosure at a high rate of speed of from about 3,000 to 6,000 or more rpm's. A spinning speed of 5,000 rpm's is believed to be useful. A suitable housing for and operation of linear and rotary brushes for uncoating are described in various embodiments in commonly owned U.S. patent application Ser. No. 11/856,270 filed on Sep. 17, 2007 and entitled "Brush Assembly for Removal of Excess Uncured Build Material," and in U.S. Provisional Patent Application Ser. Nos. 60/949,614 filed Jul. 13, 2007 and 60/956,051 filed Aug. 15, 2007, from which the present application claims priority and the contents of which are incorporated herein in their entirety.

There are several factors impacting operation of the brush. Regardless of whether a linear or rotating brush is selected, the brush should stroke the surface of the build a sufficient number of times to remove sufficient excess uncured build material and the brush should be cleared of the build material so as not to redeposit the material on the build surface and so as not to contaminate the cartridge. It is desirable to provide strokes as rapidly as possible to remove material from the build without, at the same time and prior to a separate clearing step, propelling the material from the brush. The rapidity of the strokes is empirically determined. The force holding the material on the brush is proportional to the surface energy of that material on the fibers comprising the brush. For higher surface energies, stroke speed typically is somewhat higher than for lower surface energies.

For a rotating brush, the centrifugal force on the resin is also a function of the angular speed in rpm's and the brush diameter. For a nylon bristle brush of 1.25 inches in diameter and a build material as described herein, 360 rpm has been demonstrated to be a suitable spinning speed for cleaning: not too fast to avoid propelling material from the brush, and not too slow clean inefficiently.

Multiple sweeps of the brush across the build surface are typical, in both directions, left and right. The rotating brush moves counter to the direction in which it would rotate freely simply by contacting the build surface.

The rate at which the brush assembly is extended and retracted across the surface of the build may vary within certain limits, although a faster rate generally improves cycle time while a slower rate provides more cleaning. A suitable combination of sweeps and rates is from about 1 to 5 sweeps at from about 1 to 9 inches per second.

Brush penetration, which is the amount of interference between the tips of the bristles and the build surface, also contributes to removing excess uncured build material from the build surface. Higher penetration is more effective, but too much can damage delicate build surfaces. The embodiments illustrated contemplate about 0.080 inch of penetration.

It should be noted that the parameters discussed above vary somewhat depending on the stage of the build. For example, when building supports, clean side (vertical) walls are not as important and the brush can be applied more slowly to sop up large amounts of uncured material from the horizontal surfaces. A rotating brush can be rotated in the same direction and at the same speed as it freely would rotate.

To clear the brush of build material, the brush is move away from the image plane and cleared in a manner to preclude the build material removed therefrom from impacting the build. For example, in U.S. patent application Ser. No. 11/856,270 referred to hereinabove, the brush is contained within shields. In one embodiment, the brush is rotated to propel the build material from the brush; the faster the brush is rotated, the better. The material removal rate increases with the square of the rpm. Three thousand rpm clears a 1.5 inch brush and 5,000 rpm will clear the same brush faster. A smaller brush typically will require somewhat higher rpm, and speeds above 6,000 rpm can be achieved provided the mechanical rotational apparatus is sufficient. If there is a large amount of excess material to be cleared from the brush, then the brush is cleared between sweeps. If there is only a small amount of material, then the sweeps can be completed for a cleaning cycle and the brush cleared at that time while a UV lamp exposure takes place.

The apparatus of FIG. 1 may be contained in a housing 49, if desired. The interior of the housing can be heated, which can be beneficial to the operation and performance of the apparatus. Heating can increase the range of build materials useful in the practice of the invention by reducing the viscosity of build materials that otherwise may be difficult to process by flexible transport or require the addition of diluents. Diluents can compromise the qualities of the products made from the build material by, for example, increasing brittleness or reducing mechanical strength. Heating allows the use of higher molecular weight starting materials and reduces the viscosity of some build materials to less than about 1,000 centipoise and in some instances to about 600 centipoise. Heating the build material by as much as ten degrees Centigrade typically results in some benefits. Typically, a temperature of about 90 degrees Centigrade has proved to be useful.

A build pad 30 typically is provided on an elevator platform 32 between the build and elevator in solid imaging apparatus. Solid support structures supporting the build are created by the solid imaging apparatus directly on the build platform. Many configurations of build platforms have been provided. Build platforms for orienting a build in an upside down position as illustrated in FIG. 1A are described in U.S. Provisional Patent Application Ser. No. 60/885,257 filed on Jan. 17, 2007; 60/949,614 filed Jul. 13, 2007; and 60/956,051 filed Aug. 15, 2007 and from which the present application claims priority, and in U.S. patent application Ser. No. 11/856,209, filed Sep. 17, 2007 and entitled "Build Pad, Solid Image Build, and Method for Building Build Supports," the contents of all of which are incorporated herein by reference in their entirety.

It should be recognized that the system of FIG. 1A, and all of the embodiments illustrated herein, are automatically controlled by a controller, which is not illustrated, and typically are computer operated in response to pre-programmed data to operate the apparatus, including the elevator, coating and uncoating operations, imaging, post-imaging curing, and other features.

FIG. 1C illustrates an alternative embodiment of the enlarged portion of the apparatus of FIG. 1A, in which one or more UV sources 61 of intensity about 100 Watts and reflectors 63 are employed to provide cure of the build while still on the platform. Curing radiation can be applied intra-layer, which is between layers after removal of excess uncured build material, either occasionally as needed or between each layer as necessary, from all four sides or from two or three as needed. It should be recognized that the imager 22, which may emit, for example, visible light, may also emit UV light and so the imager can also be used as a source of radiation for curing the build.

As illustrated, the elevator drives 34' and 34" have been positioned so as to avoid blocking the transmission of curing radiation to the build and supports for the build that are located adjacent the build pad 30. If a source of radiation is to be used to irradiate the build through the build pad, then the build pad will need to be made of suitably transmissive materials and configured to be retained in an elevator bracket mounted on the elevator drives that will not interfere substantially with transmission of radiation. A suitable radiation transparent build pad and elevator bracket assembly is described in commonly owned and copending U.S. provisional patent application Ser. No. 60/885,257, filed Jan. 17, 2007 and incorporated hereinabove.

It should be recognized that through-cure of the build can be achieved in the practice of the invention described herein by using a high intensity UV source in the imager location 22. This through-cure, in which sufficient radiation is provided through the depth of the build to allow for radiation absorption in the build layers and to cure the build to the far side adjacent the build pad 30, would be similar to that described in U.S. Provisional Patent Application Ser. No. 60/956,051 filed Aug. 15, 2007 and from which the present application claims priority, the contents of which are incorporated hereinabove. A mirror assembly can be used to transmit the image to the image support plane 42 and the mirror assembly can be operated in a reciprocating manner to provide clearance for a high intensity curing radiation. One example of a high intensity source is a UV lamp of about 600 Watts. Radiation can be applied at approximately 80 milliwatts per square centimeter for about 10 seconds for each layer. Radiation of about this intensity should eliminate the need for additional irradiation on the other surfaces of the build to achieve a dry, fully reacted part.

Figure 1E:
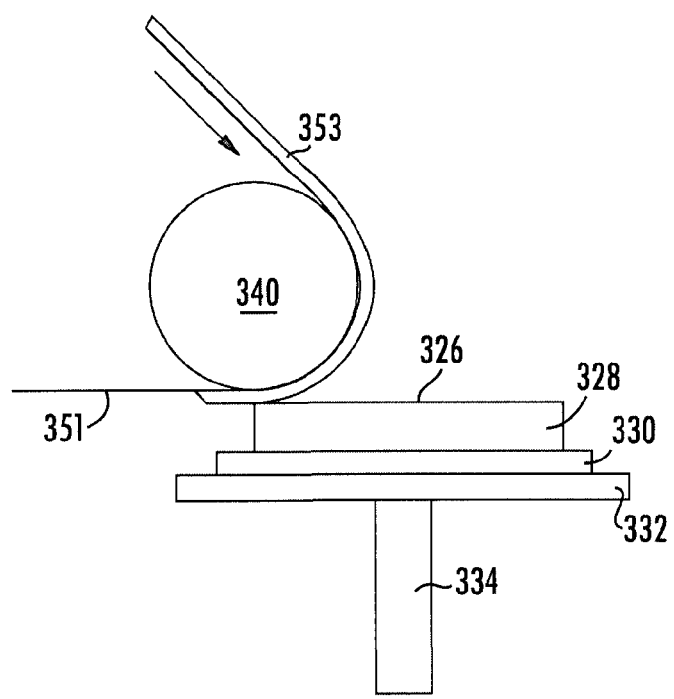
FIG. 1E is an enlarged view of a portion of the apparatus shown in FIG. 1D.

FIGS. 1A and 1B illustrate the build held in an upside down position, which is advantageous for allowing excess uncured build material to move by gravity to the lower surfaces of the build and facilitates removal of the excess and UV curing of the layers while the build is on the elevator. FIGS. 1D and 1E illustrate an alternative arrangement in which the build 328 and build pad 330 are held in an upright position on an upright elevator platform 332 and elevator drive 334. Reciprocating transport surface 336 is mounted in a triangular configuration about rollers 340, at least one of which is driven. Transport surface 336 picks up build material from a reservoir 337 and gravure roll applicator 338 for transport to the build. The transport surface 336 shown on the left hand side of FIG. 1D comprises two sections, a coating section 353 and a continuous portion 351, as shown on the right hand side of FIG. 1D, which may be, for example, a toothed flexible belt for engaging the rollers 340 for driving the coating section in a reciprocating manner.

FIG. 1E further illustrates contact of the coating section 353 of the transport surface with the build 328 and shows that the roller 340 at the leading edge of the transport surface pushes the transport surface into contact with the build surface, which is the case whether the reciprocating transport surface is in the configuration of FIG. 1A or 1D or the other embodiments illustrated hereinafter. Either or both wheels 340 could be driven or another mechanism used, although not necessarily with equivalent results. The first roller 340 to encounter the build platform and build surface is generally rigid to set the build material thickness. While no reciprocating carriage is illustrated in FIGS. 1D and 1E, it should be recognized that a carriage similar to that of FIG. 1A would be used in connection with FIG. 1D and that the transport configuration of FIG. 1D can be used in the embodiment of FIG. 1A with the elevator of FIG. 1D inverted. The combination of the reciprocating carriage 35 (FIG. 1) moving to the right and the reciprocating belt rotating to the left as in FIGS. 1A and 1D reduces relative motion between the build surface and the belt and reduces the possibility of air entrapment in the fresh layer on the build surface.

The coating belt illustrated in FIGS. 1A through 1E and elsewhere throughout the drawings normally is a film of sufficient strength for reciprocating travel and that provides a surface for readily picking up build material and for releasing the build material to the build on the elevator platform. Generally speaking, nonelastic belts known to be suitable for flexible transport solid imaging are suitable for use as coating belts in the practice of the invention. The belt typically will be a film composed of one or more polymer build materials, such as polypropylene, polycarbonate, fluorinated ethylene propylene, and mixtures and co-polymers thereof PTFE films including Teflon brand films are useful, in part because they release the build material to the build surface well. Regardless of the material used, the belt should be sufficiently transparent to radiation for solid imaging when the belt is placed between the radiation source and the build material.

The build material normally is a flowable build material for solid imaging that is responsive to the radiation source and can be taken up on a flexible transport film and conveyed by the film to the build in the image plane. A wide variety of these build materials is known for stereolithography. If the radiation source is a digital light processor, or "DLP" source, then the build material typically solidifies in response to visible and ultraviolet light and the build material will contain initiators for both these light sources. The build material for flexible transport imaging should readily solidify upon exposure to radiation, should have good adherence to the build, and be readily released from the transport surfaces, whether the coating or uncoating surfaces. Suitable build materials are described in U.S. patent application Ser. No. 11/096,739 filed Apr. 1, 2005 and entitled "Radiation Curable Compositions Useful in Image Projection Systems," the contents of which are incorporated herein by reference in their entirety. Such build materials typically include a poly(meth)acrylate compound, a urethane poly(meth)acrylate compound, a polyester poly(meth)acrylate compound, a silicone poly(meth)acrylate compound, and polymerization initiators for visible and UV light.

Figure 1F:
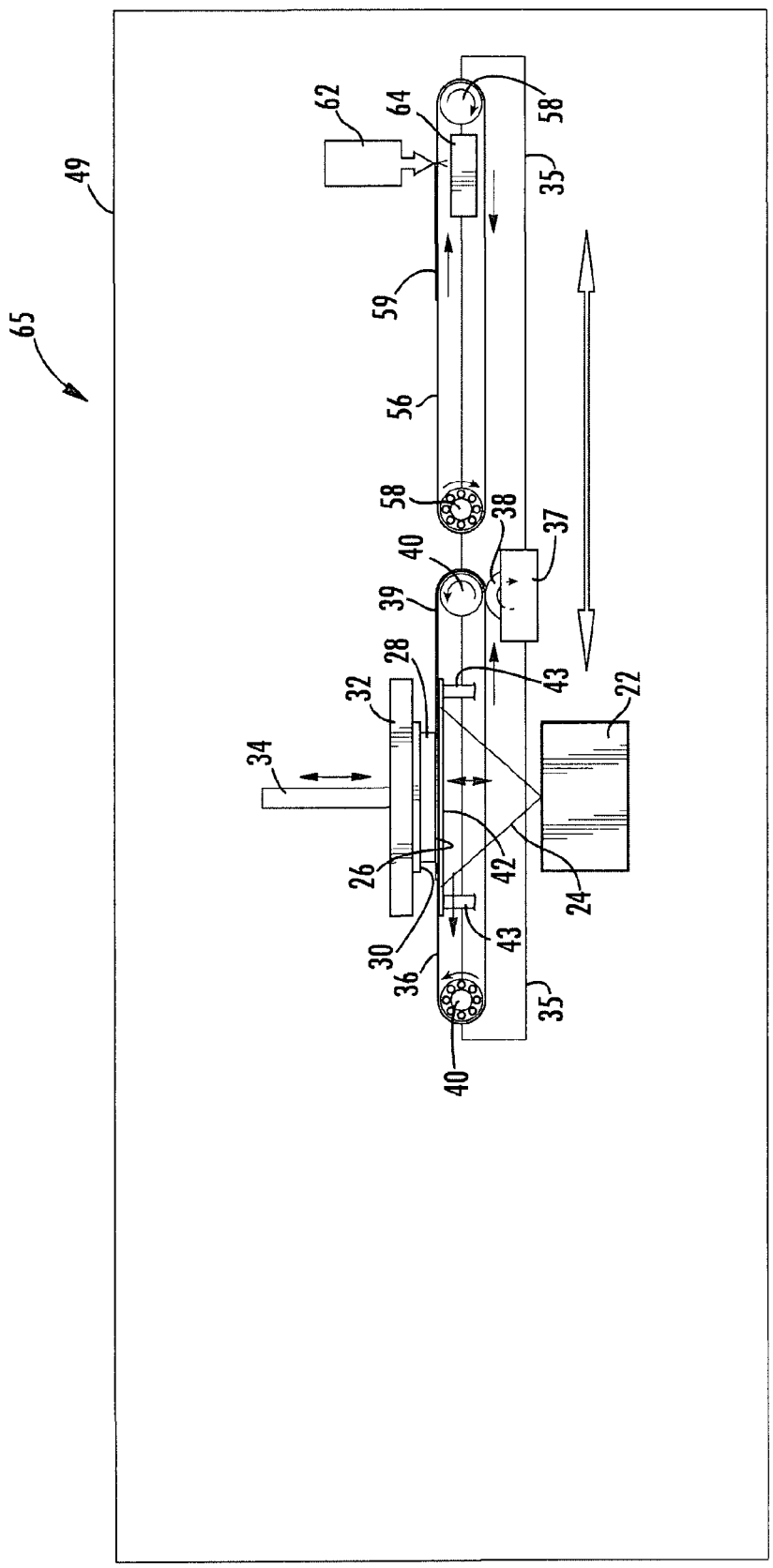
FIG. 1F is a schematic longitudinal plan view of another embodiment of the invention during the coating and imaging stage of the apparatus's operation, similar to that of FIG. 1A, and illustrating instead of a rotating transport surface for uncoating, a reciprocating transport surface.
Figure 1G:
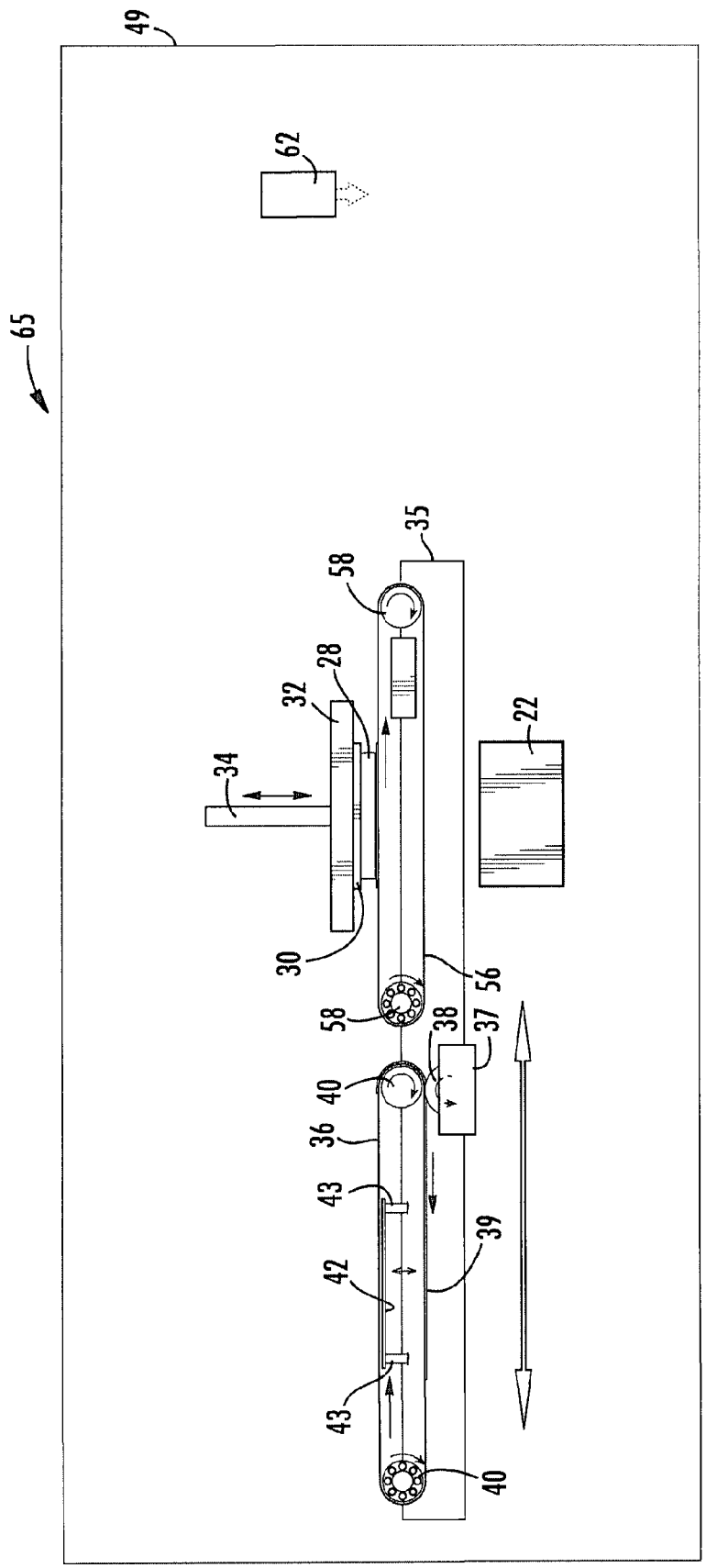
FIG. 1G is a schematic longitudinal plan view of the apparatus of FIG. 1F showing the stage for uncoating by removing excess uncured build material from the build.

FIGS. 1F and 1G illustrate an alternative to the embodiments of FIGS. 1A through 1E, which is the inclusion of a second reciprocating transport surface 56, which could be as shown or in the triangular configuration of FIG. 1D, for the purpose of removing excess uncured build material from the build surface 26 after irradiation. It should be recognized that this second transport surface is an alternative uncoating device to the spinning brush 45 shown in FIG. 1A. It should also be recognized that the first and second transport surfaces are different surfaces, the first transport surface transporting build material to the build surface in the image plane and the second transport surface removing excess uncured build material from the image plane.

In FIG. 1F, the reciprocating carriage frame 35 is shown in its right-most position for applying a layer of build material 39 to the build and imaging the build 28 in the manner described for FIG. 1A. A reciprocating transport belt 36 for coating the build with fresh, uncured build material 39 is mounted on the carriage frame. The coating belt picks up build material from a source 37 by contact with a gravure applicator roll 38. The build material source and gravure applicator roll are also mounted on the carriage. As the carriage moves the belt, gravure roll, and build material source to the right most position, the belt rotates about roller wheel 40 to the left as indicated by the rotational arrows to pick up the solid imaging build material on the belt from the source and deposit the build material on the build surface 26.

In FIG. 1G, the frame is shown in its left most position for removing excess uncured build material on the build after imaging and before application of a fresh layer of uncured build material to the previously cured layer. Excess uncured build material typically remains only about the edges of the build surface after imaging. A second reciprocating transport surface, uncoating belt 56, is mounted on the carriage frame 35 and driven about wheels 58, one or both of which may be driven or another drive mechanism chosen. Unlike the coating belt wheels, the uncoating belt wheel 58 that first contacts the uncoating belt with the build surface is somewhat flexible and resilient to press the belt into the build to remove uncured build material to the uncoating belt. Just as is the case for the coating belt, the combination of the reciprocating carriage moving to the left and the reciprocating uncoating belt rotating to the right reduces relative motion between the build surface and the belt. The uncoating belt can dab the build surface multiple times if necessary by moving the part away from the uncoating belt and moving the uncoating belt to a clean position and lowering the moving part back to contact the uncoating belt.

The uncoating belt provides a porous surface for take-up and release of uncured build material. For example, the uncoating belt may typically be an absorbent web selected from cotton or paper or nonwoven thermoplastic polymers. The uncoating belt should be sufficiently structured to stand up to reciprocating service on the drive mechanism for the belt and dabbing of the build to remove uncured build material.

The uncoating belt readily receives and retains the build material and yet is sufficiently porous to release the uncured build material for disposal or recycling. After removing uncured build material from the build, the uncoating belt transports the excess uncured build material 59 (FIG. 1F) away from the image plane for disposal or reuse. Returning to FIG. 1E, the reciprocating carriage 35 moves to the right to transport the uncoating belt 56, loaded with uncured build material 59, to remove the uncured build material from the belt. Shown in FIGS. 1F and 1G is a source of pressurized fluid, such as an air knife 62 mounted in a fixed position with respect to the carriage 35 to propel from the uncoating belt and into a receptacle 64 that is mounted on the carriage frame the excess uncured build material removed by the uncoating belt from the build surface. The belt moves to the right over the receptacle as shown by the rotational arrows to encounter pressurized air over the extent of excess uncured build material.

In operation, the elevator platform 32 moves the build 28 incrementally to keep the build surface 26 in the image plane for picking up a layer of fresh build material 39 from coating belt 36 (FIG. 1F), for imaging of the fresh layer from the radiation source 22, and for removal of uncured build material 59 by the uncoating belt 56 (FIG. 1G). As the carriage 35 moves back and forth to contact either the coating or uncoating belts with the build surface in the image plane, the belts move in the opposite direction at a controlled speed to preclude relative motion between the build surface and the belt. Likewise, the belts are reciprocated in the opposite direction from the carriage when the carriage removes either the coating belt or the uncoating belt from the build. Reducing relative motion between the belt and the build surface substantially eliminates entrapment of air in the fresh build material layer laid down by the coating belt and avoids breaking delicate features of the build by both the coating and uncoating belts.

FIG. 1H illustrates in an enlarged view the coating belt of FIG. 1G out of contact with the build and reciprocated left. The belt moves in the direction indicated by the arrows and remains in contact with the gravure roll 38. It is immaterial to the operation of the apparatus that the belt is coated with build material 39 upon reciprocating out of contact with the build. Image plane supporting plate 42 and its elevator mechanism 43 are also mounted on the carriage and are lowered during belt travel. As can be seen more clearly in FIG. 1I, the coating belt comprises a transport section 53 connected to form a continuous loop by straps 51, which may be, or example flexible toothed belts. These two sections form the coating belt 36 of the prior figures as a bilaterally endless surface, similar to coating belt 336 of FIGS. 1D and 1E.

Figure 1J:
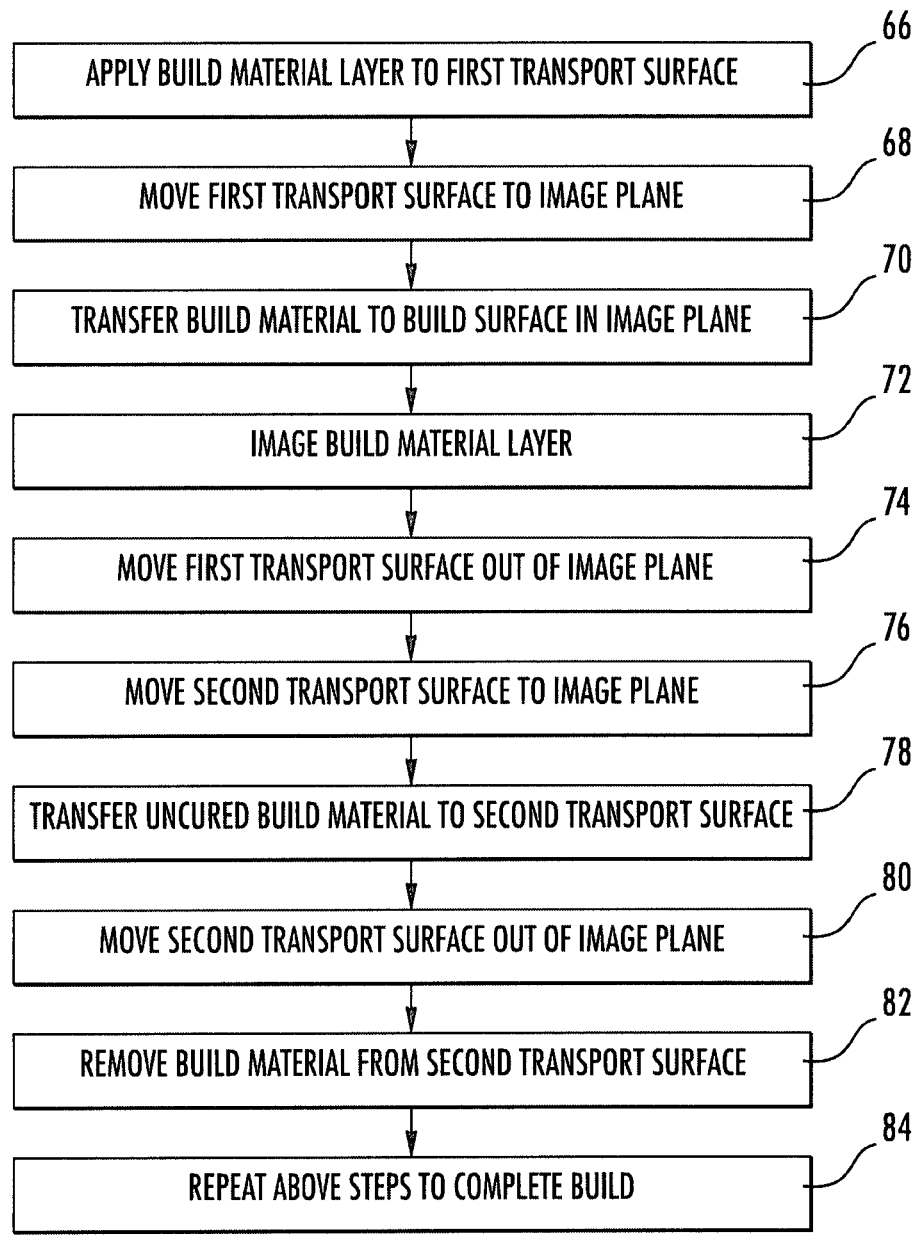
FIG. 1J is a flow diagram showing the steps of one embodiment of the method of the invention associated with the apparatus of FIGS. 1A and 1F.

Referring now to the flow diagram in FIG. 1J, and as shown in FIGS. 1F and 1G, the reciprocating carriage has been moved to its right-most position, which in the embodiment illustrated is a coating position. The reciprocating carriage aligns the coating belt with the build surface in the image plane. As the coating belt is moved into position, moving counterclockwise, the gravure wheel rotates clockwise, engaging the coating belt and applying a layer of build material to the portion of the coating belt surface that contacts the build surface on the build platform, in accordance with step 66 (FIG. 1J). The carriage moves right and the coating belt moves left at a controlled speed to bring the coating belt into the image plane, step 68, and preclude relative motion of the coating belt at the image plane. Applying the build material with the rolling motion prevents air from being entrapped in the build material transferred to the build and controlling relative motion between the build and the coating belt also reduces the opportunity for damage to delicate structures on the build. Once the belt transfers build material to the build, in accordance with step 70 (FIG. 1J), the imager irradiates the image plane with focused radiation, step 72, to solidify the build material, thereby creating a new layer of the solid build. Thereafter, the coating belt rotates in the opposite direction as the carriage moves to the left to remove the uncured portion of the coating of build material from the build area and to peel the cured portion of the build material from the belt and to remove the belt out of the image plane, in accordance with step 74. Moving the carriage to the left also brings the uncoating belt into contact with the freshly imaged layer, in accordance with step 76.

As shown in FIG. 1G, the reciprocating carriage has been moved to its leftmost position into an uncoating position. The reciprocating carriage aligns the uncoating belt with the image plane. As the uncoating belt is moved into position, reciprocating clockwise, the belt contacts the build surface at the image plane and removes uncured build material from the previous coating operation, in accordance with step 78. The carriage moves left and the uncoating belt moves right at a controlled speed to preclude relative motion of the uncoating belt at the image plane, as previously explained, to preclude damage to delicate build structures.

Once the belt receives build material from the build, the uncoating belt turns in the opposite direction and the carriage reciprocates to the right, as shown in FIG. 1F to move the uncoating belt out of the image plane and to complete the cycle, step 80. As shown in FIG. 1F, when the uncoating belt has reached its right-most extreme position, the uncoating belt is moved across the air knife which provides pressurized fluid, typically air, to dislodge and push uncured build material through the uncoating web to a reservoir below, step 82. These steps are repeated in accordance with step 84 to complete a build of multiple layers.

It should be recognized that the integration of an uncoating station in the reciprocating cartridge system described with reference to FIGS. 1A through 1I produces a cleaner part by removing excessive build material between layers. The apparatus and method are capable of producing builds that do not require further cleaning prior to a final cure, depending on the configuration of the build. Some complex build shapes may still have some residual uncured build material that is not removed by the uncoat belt, and these more complex builds typically are cleaner than those comparable builds provided by prior systems.

Control systems, not illustrated, provide programmable control to enable the sequence of building steps to take place, including controlling the elevator position, coating of the belt, reciprocation of the belts, application of the coating to the build pad, imaging the build, reciprocation of the carriage, removal of uncured build material, and temperature. Typically, a separate enclosure provides the control system components external of an enclosure for the carriage and elevator components. An operator's station will typically include a PC for programmable and automated operation.

Figure 2:
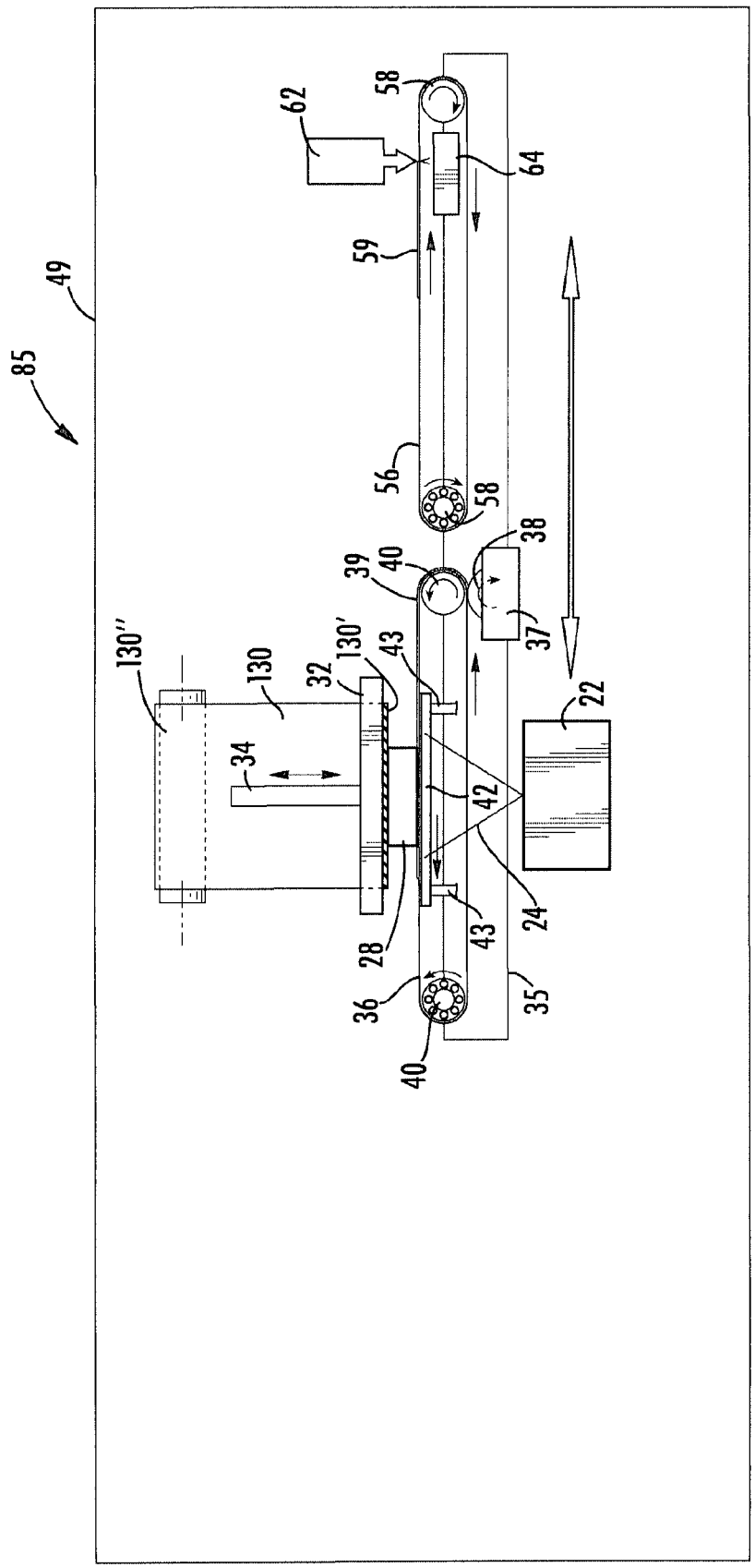
FIG. 2 is a longitudinal plan view of the embodiment of the apparatus of FIGS. 1F and 1G showing one embodiment of modifications for semi-continuous operation.

Turning now to another embodiment of the invention, FIG. 2 illustrates an embodiment similar to that of FIGS. 1F and 1G modified for semi-continuous operation. The build pad is a continuous belt 130 rather than the discreet build pad 30 of the embodiment of FIGS. 1F and 1G. The other aspects of the apparatus as illustrated are the same as those of FIGS. 1F and 1G, although is should be recognized the spinning brush of FIG. 1A or the transport configuration of FIG. 1D could be used. It should be recognized that the semi-continuous embodiment is not limited to the apparatus of the embodiment of FIGS. 1F and 1G and could be applied to the other embodiments within the scope of this detailed description.

The continuous belt build pad 130 is oriented perpendicular to the travel of the reciprocating carriage 35 that contains the coating and uncoating belts 36 and 56, respectively. The continuous belt 130, seen in section at 130' at the image plane, travels over the image plane in an indexing fashion, indexing forward as each build is completed to provide a fresh platform for each new build. The continuous belt build pad 130 can comprise any suitable material that is strong enough to withstand tension, suitably grips the build during the layer-by-layer build process, and provides for ready release of the completed build from the belt. One such suitable material is Mylar.

Figure 2A:
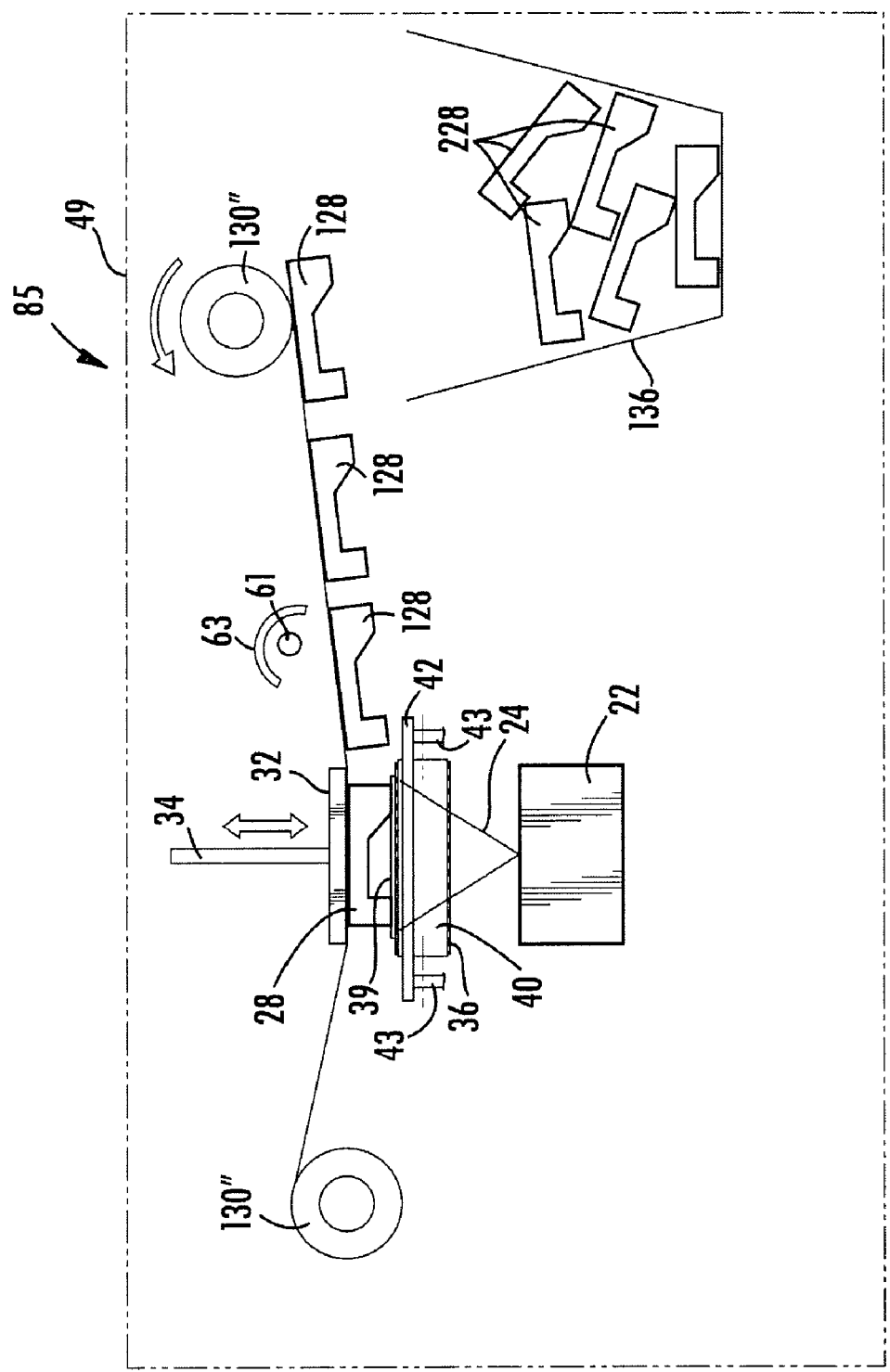
FIG. 2A is a transverse plan view of the modifications of FIG. 2.

As shown in FIG. 2A, the continuous belt platform 130 is provided by a supply roll 130' and a take-up roll 130". The continuous belt travels from the supply roll over the elevator platform 32 between the elevator platform and the build 28 and can be held in place on the elevator by tension or through the use of vacuum between the elevator platform and the continuous belt. It should be recognized that the continuous belt 130 is stationary during a build and indexes forward toward the take-up roll to remove the completed builds 128 from the image plane and for placement of a fresh section of build pad 130 over the elevator at the image plane. As the belt indexes forward, completed builds 128' are removed and placed in a receptacle 136 for further processing or use in manufacturing, as needed. Optionally, completed builds 128' are further cured beyond the green condition to a dry condition or even to a full cure, using suitable light sources, such as UV bulb 61 and reflector 63.

Figure 2B:
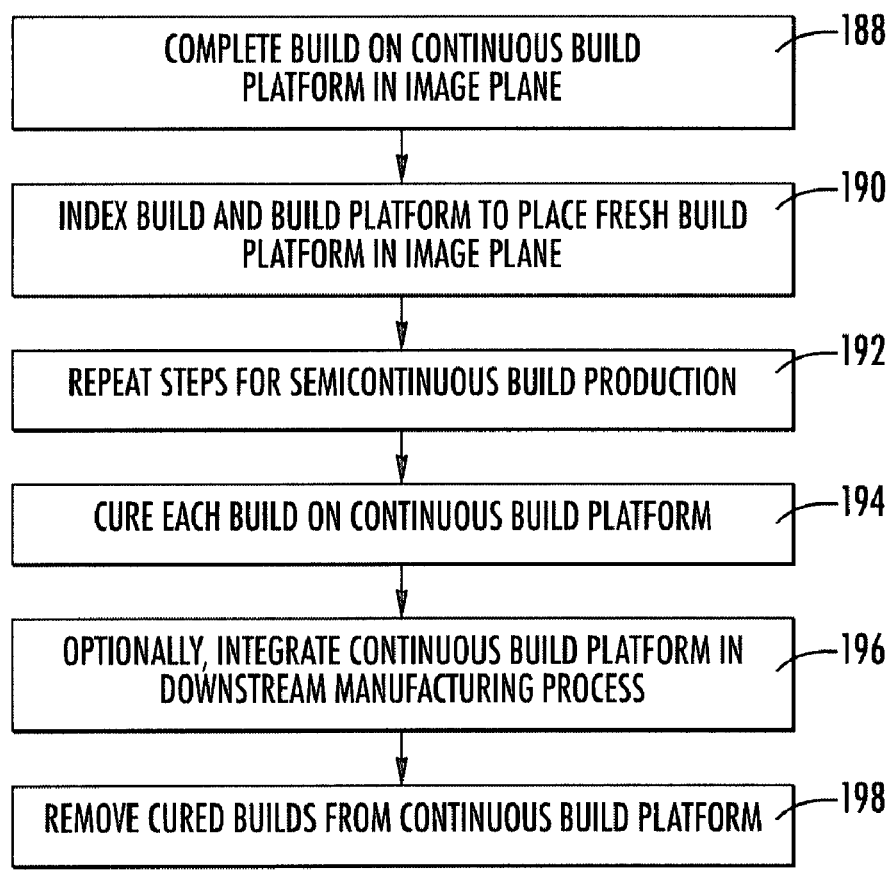
FIG. 2B is a flow diagram showing the steps of the embodiment of semi-continuous operation.

FIG. 2B illustrates the steps of the method of the aspect of the semi-continuous embodiment illustrated in FIGS. 2 and 2A. As illustrated in FIG. 2B, a clean build is completed on the continuous belt build pad in the image plane in accordance with step 188. The belt indexes forward to move the build pad and build out of the image plane and to place a fresh build pad section of the belt in the image plane, in accordance with step 190. These steps 188 and 190 are repeated for semi-continuous clean build production, step 192. One advantage of the semi-continuous embodiment is that the clean green builds can be fully cured semi-continuously and integral to the build process.

It should be understood that semi-continuous production as envisioned in the practice of the invention results in dry builds. The semi-continuous aspects of the embodiment of FIGS. 2 and 2A can also provide additional stages in a semi-continuous fashion. These additional stages can provide additional curing of green builds using ultraviolet lamp assemblies to produce fully cured builds. Additional chemical treatments can be incorporated, if desired, as may be useful in the production of hearing aids. With semi-continuous production, the solid imaging apparatus and method of the invention can even be incorporated into and become an integral part of a manufacturing process. For example, orthodontic devices typically are created over molds that are produced by solid imaging. With the practice of the semi-continuous embodiment of the invention, clean molds produced by solid imaging can be fully cured and then enter a molding station for production of the orthodontic devices on a semi-continuous basis.

FIG. 2B illustrates broadly the additional steps of the method in which the semi-continuous embodiment of the invention is useful. A build is prepared on the belt platform, as discussed, and indexed forward. Each build is fully cured on the indexing continuous build platform after removal of the build from the image plane, in accordance with step 194. Optionally, as recited in step 196, the belt can be integrated with a downstream manufacturing process to transport the fully cured builds into or through the process. Eventually, the fully cured builds are removed from the belt platform, as recited in step 198.

Figure 3:
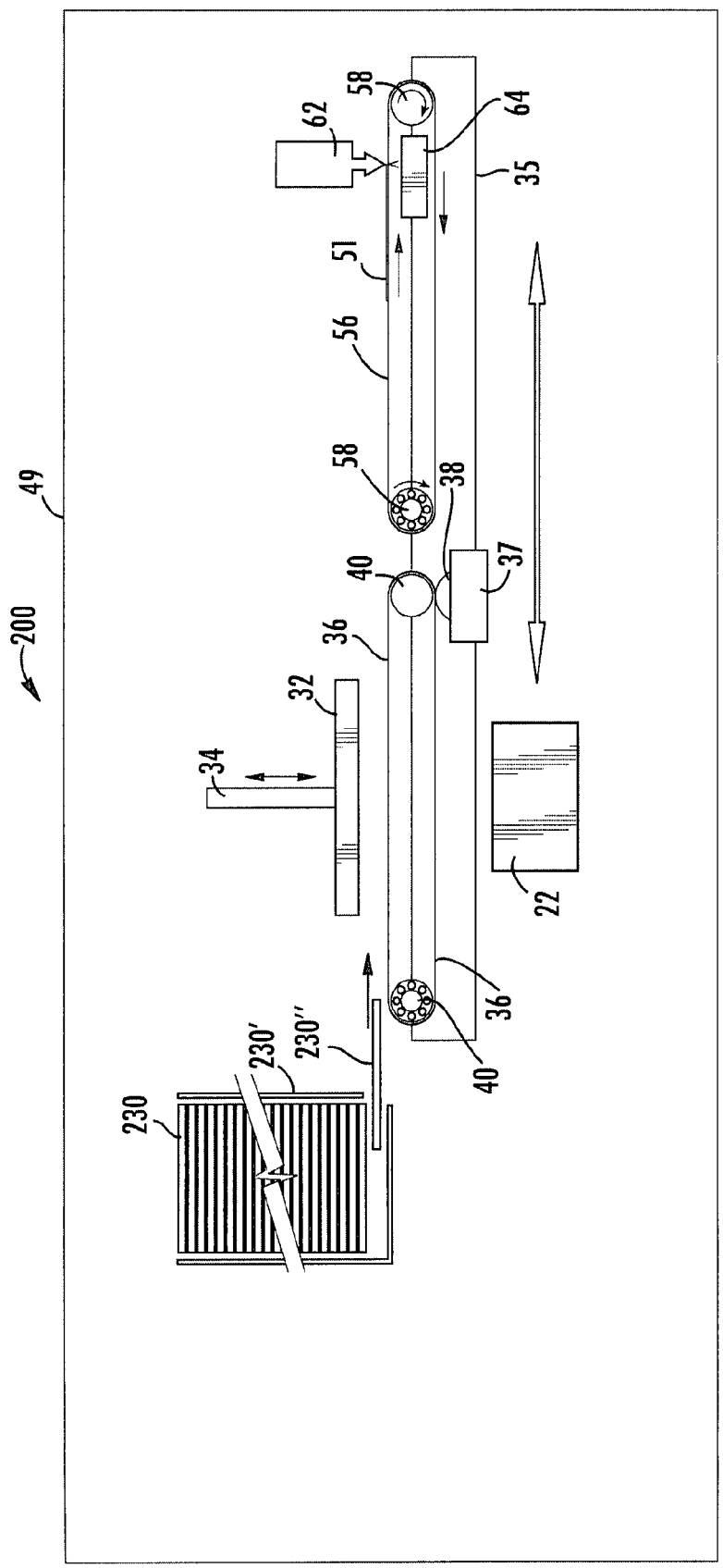
FIG. 3 is a longitudinal plan view of the embodiment of the apparatus of FIGS. 1F and 1G showing an alternative embodiment for semi-continuous operation.

FIG. 3 illustrates a second semi-continuous embodiment of the invention adapted for automatic removal and replacement of discrete build platforms from the apparatus illustrated in FIGS. 1G and 1H. As is true regarding FIG. 2, the other aspects of the apparatus as illustrated in FIG. 3 are the same as those of FIG. 1F, although the optional image plane supporting plate 42 and drive 43 (FIG. 1F) are not illustrated. It should be recognized that the semi-continuous embodiment of FIG. 3 is not limited to the apparatus of the embodiment of FIG. 1G and could be applied to the other embodiments within the scope of this description.

As illustrated in FIG. 3, the elevator 34 and elevator platform 32 are shown raised well above coating belt 36. The previous build will have been completed and the build and the build platform on which the build would have been supported have been removed. A new build on a fresh platform has not yet started. The reciprocating carriage 35, the coating and uncoating belts 36 and 56, respectively, are stationary.

A stack of discrete build platforms 230 is provided in a dispenser 230' and a fresh build platform 230" is being removed from the dispenser and transmitted to the elevator platform 32. In the embodiment of FIG. 3, these build platforms would be removed and replaced, from the dispenser to the elevator and from the elevator with a completed build, with conventional pick and place systems (not shown) adapted for use with the apparatus of the invention. The build platform 230" is secured to the elevator platform and aligned with the image that is produced by the imager 22.

Figure 3A:
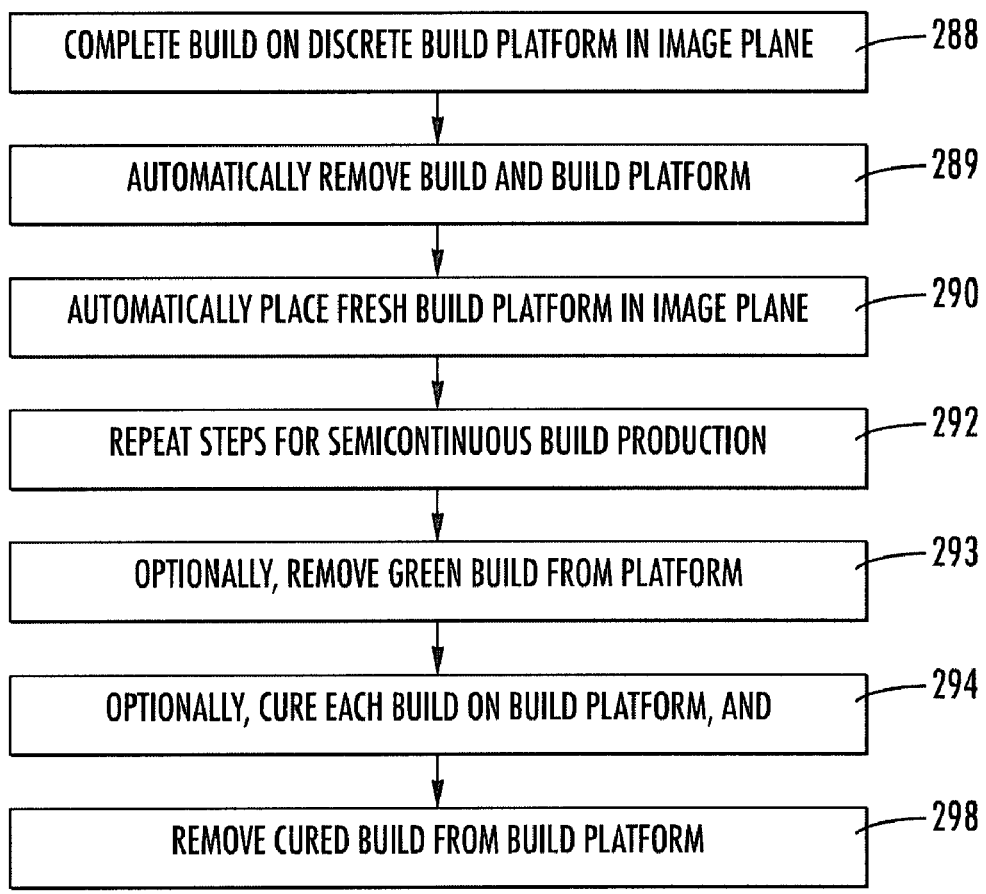
FIG. 3A is a flow diagram showing the steps of the embodiment of semi-continuous operation associated with the apparatus of FIG. 3.

The steps of the method for practice of the embodiment illustrated in FIG. 3 are illustrated in FIG. 3A. First, a complete and clean build is completed on one of the discrete build platforms in accordance with step 288. A pick and place system or other suitable system removes the build and the build platform in accordance with step 289. The system then secures a fresh build platform on the elevator platform and aligns the build platform with the imager in the image plane, step 290. These steps 288, 289, and 290 are repeated, step 292, for semi-continuous clean build production.

Optionally, in accordance with step 293, the clean green build can be removed from the build platform on which it was made, or the build can be fully cured on the platform, step 294, and then removed from the build pad, step 298. Steps 294 and 298 can be performed, if desired, after step 288 and while the build 28 and build pad 30 are still in place on the elevator platform 32 (FIG. 3), or after removal in accordance with step 289.

Figure 4:
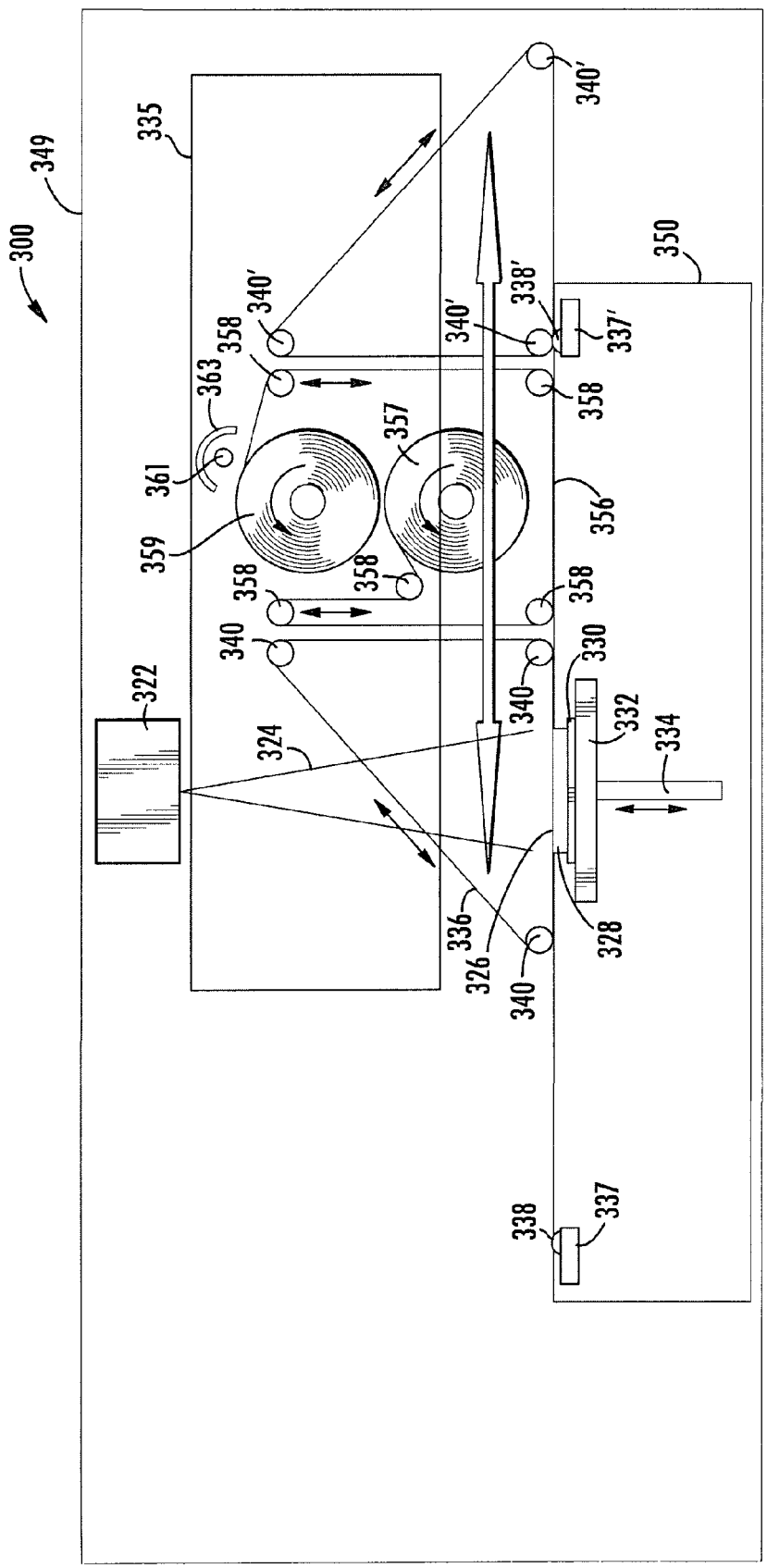
FIG. 4 is a longitudinal plan view of another embodiment of the apparatus of the invention having two reciprocating transport surfaces similar to that of FIG. 1D located in tandem with an intervening transport surface for removing uncured build material.

FIG. 4 illustrates a longitudinal plan view of an embodiment of the apparatus of the invention capable of using build material from more than one source. The embodiment of FIG. 4 can provide clean builds made of more than one build material. This embodiment provides two endless reciprocating coating belts 336 and 336' in tandem with an intervening indexable and reciprocatable uncoating belt 356, each of which is mounted to a carriage 335 for reciprocating movement of the assembly of coating and uncoating belts over a build platform 332 on which is mounted a build pad 330. The build pad 330 is elevated by a driver 334 and elevator platform 332. The build is imaged by imager 322. Gravure applicator rolls 338, 338' and reservoirs 337, 337' are fixed on a supporting frame 350 and the coating belts travel over them as the carriage reciprocates back and forth. The gravure rolls and reservoirs are not mounted on and do not reciprocate with the carriage as in FIGS. 1A and 1F. Other aspects of the FIG. 4 embodiment include heating of the apparatus in an enclosure 349. The materials used for the belts and composition of the build materials are similar to those discussed above.

As in all the embodiments discussed herein, the combination of the reciprocating carriage moving in one direction and the reciprocating coating and uncoating belts moving in the opposite direction reduces relative motion between the build surface and the belts and reduces the possibility of air entrapment in the fresh build material layer applied to the build surface and breakage of delicate build structures. While there are several similarities between the previous embodiments and that of FIG. 4, it should be noted that the build is not upside down in the embodiment of FIG. 4 and following.

The coating belts 336 and 336' are arranged in triangles about three rollers, which may be tensioning or drive rollers as needed. The three rollers 340 are associated with coating belt 334. Rollers 340' are associated with coating belt 336'. The coating belts each could also be arranged about two rollers 40 in the manner illustrated in FIG. 1A, if desired. As in the embodiment of FIGS. 1A and 1E, the leading roller to encounter the build surface on the build platform is sufficiently rigid to set the build material thickness.

The coating belts provide alternate coating of a build 328 from separate sources of build material, reservoirs 337 and 337', respectively. These separate sources can contain the same or different build materials. Reservoir sources 337 and 337' supply build material to gravure rolls 338 and 338', respectively, in each reservoir, which gravure rolls transfer build material to the coating belts for transport to the image plane similar to the way in which this is accomplished and described with reference to FIG. 1A.

The uncoating belt 356 is a continuous indexable and reciprocatable belt supplied from a supply roll 357 over drive and tensioning rollers 358 to a takeup roller 359. Rollers 358 at the bottom are each the first to contact the uncoating belt with the build surface, depending on whether the carriage is reciprocating right or left, and so both of these rollers are somewhat flexible and resilient to press the belt into the build to remove uncured build material to the uncoating belt. Fresh uncoating belt can be provided as needed by indexing the belt from the supply to the takeup roller.

FIG. 4 illustrates a reflector 361 and UV bulb 363 for curing the uncured build material on the uncoat belt as it winds onto the takeup roll for disposal of the used belt. Alternatively, the build material recovery system and uncoating belt configuration of FIGS. 1E and 1F can be employed, adding a second coating belt on the opposite side of the uncoating belt from the first coating belt, with an air knife or other suitable apparatus to knock the build material out of the web of the uncoating belt. It should be recognized that if the sources of build material 337, 337' are ink jet sources, then an uncoating device 356 should be unnecessary in either of these configurations.

In operation, the first coating belt 336 receives a layer of coating material from source 337 via contact with a gravure roll 338. The belt moves to the image plane and transfers the build material to the surface 326 of build 328 in the image plane defined by imager 322. The imager 322 supplies focused solid imaging radiation 324 to harden the build material. Thereafter, the carriage, including coating belts 336 and 336' and intervening uncoating belt, web 356, will index left, moving coating belt 336 out of the image plane and placing the uncoating belt 356 in contact with the surface of the hardened build to remove any excess uncured build material. Thereafter, the carriage continues to index left to move the uncoating belt out of the image plane. At this time or prior to the next uncoating operation, the uncoating belt may be indexed forward to expose fresh web. The uncured coated portion of uncoating web 356 can be cured at this time by flash exposure for eventual disposal.

As the uncoating belt moves into position over the build platform and build pad, the second coating belt 336' picks up build material from source 337' via contact with a gravure roll 338'. As the uncoating belt continues to index to the left out of the image plane, the carriage places the second coating belt 336' over the build platform to transfer build material for imaging onto the build on the build pad. The carriage then moves the coating and uncoating stages to the right to bring the uncoating web 356 again into contact with the build for uncoating. Repeating all of these steps produces a build.

Figure 5:
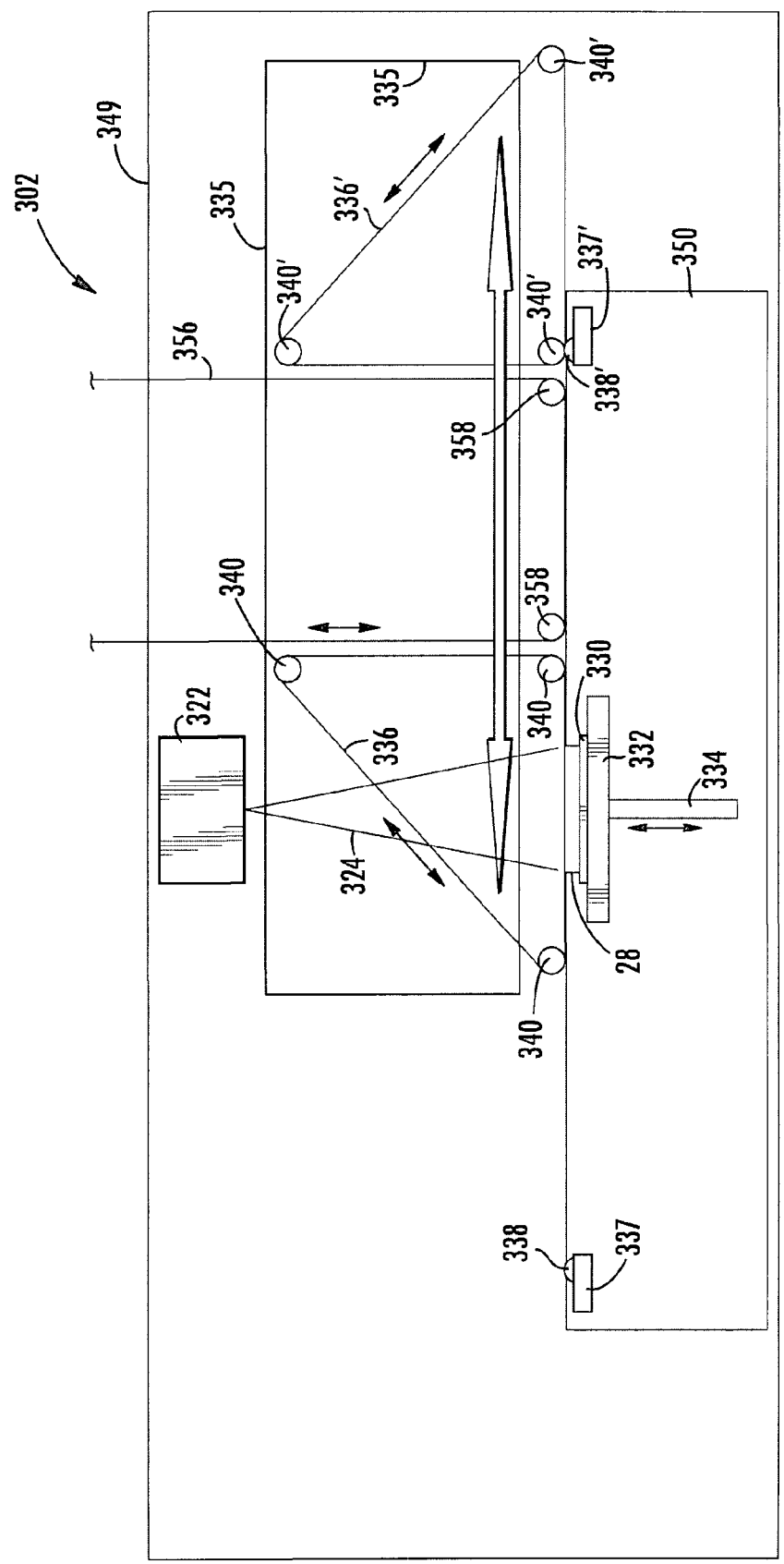
FIG. 5 is a longitudinal plan view of another embodiment of the apparatus of the invention similar to that of FIG. 4 in which a supply and take-up for the intervening transport surface is located generally outside the apparatus as illustrated.

FIG. 5 is a longitudinal plan view of a similar embodiment of the apparatus of FIG. 4 and having larger supply and take-up rolls of uncoating media, not shown, located remote from the coating and uncoating carriage so as not to interfere with the imager 322 during reciprocation of the coating and uncoating stations. In place of supply and take-up rolls of uncoating web mounted on a reciprocating roll carriage, as are rolls 357 and 359 in FIG. 4, the supply and take-up rolls in the embodiment of FIG. 5 are provided detached from the moving assembly. Web turning rollers may be provided to direct the uncoating belt to the uncoating position from the supply roll and from the uncoating position to the take-up roll. Other elements are similar to those of FIG. 4 and bear the same numbers; operation is generally as described with respect to FIG. 4.

Figure 6:
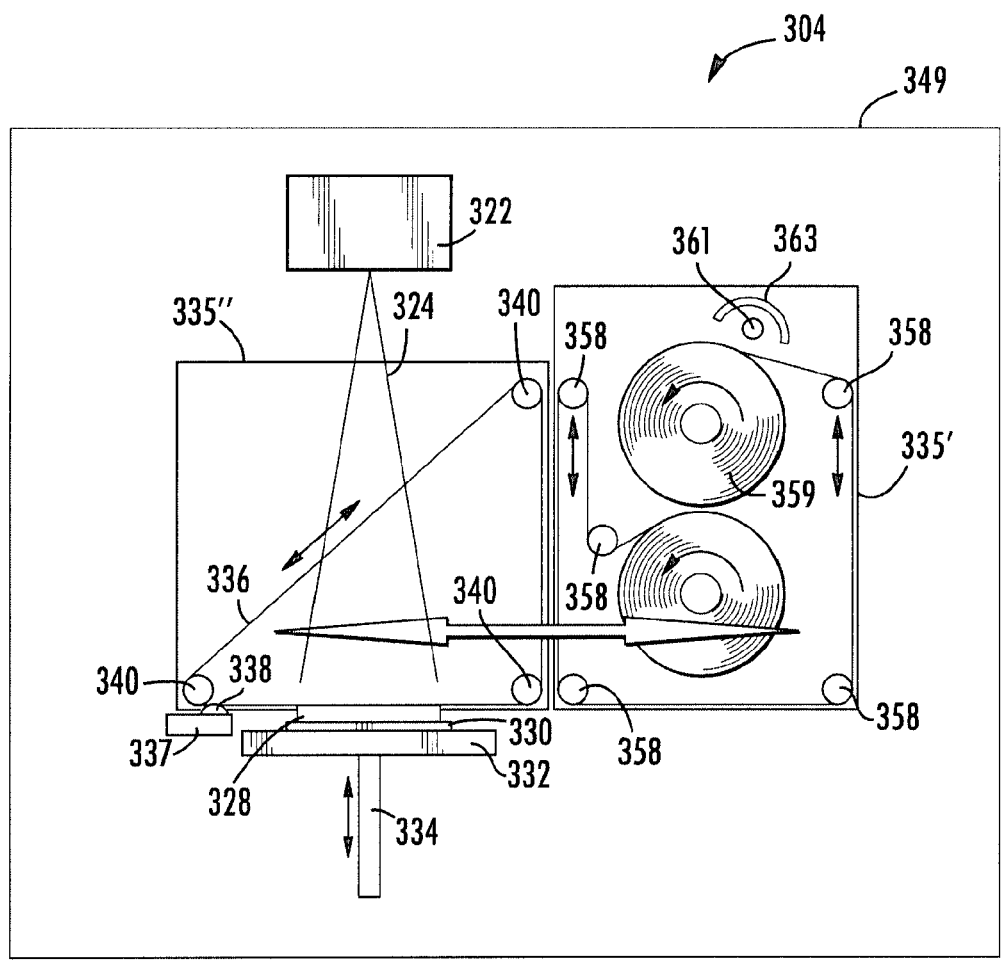
FIG. 6 is a longitudinal plan view of still another embodiment of the apparatus of the invention having a single reciprocating transport surface and integrated supply and take-up rolls of for a second transport surface for removing uncured build material.

FIG. 6 is a longitudinal schematic plan view of another embodiment of the apparatus similar to that of FIG. 4 and designed for use with a single source of build material. The apparatus of FIG. 6 has a single coating belt 336 that receives solid imaging build material from a fixed reservoir source 337 via a gravure wheel 338 over which the coating belt passes as the carriage reciprocates. The build material is then applied layer-by-layer to a build 328 supported by an elevator drive 334, elevator platform 332, and build pad 330. An imager 322 exposes each layer of build material to radiation 324 to solidify the layer. A supply roll 357 and a take-up roll 359 provide fresh uncoating web 356 for removing uncured build material from the build between application of fresh layers. The build material removed from the build part is solidified by a flash exposure radiation source, a UV lamp 361 and reflector 363, before it is wound onto the take-up roll. The coating and uncoating belts are contained in enclosure 349 and can be heated so that the benefits of heating the build material for take up on the coating belt and application to the build can be realized as discussed above. Reciprocating operation of the device is as described above with respect to FIG. 4, although without the second coater.

Figure 7:
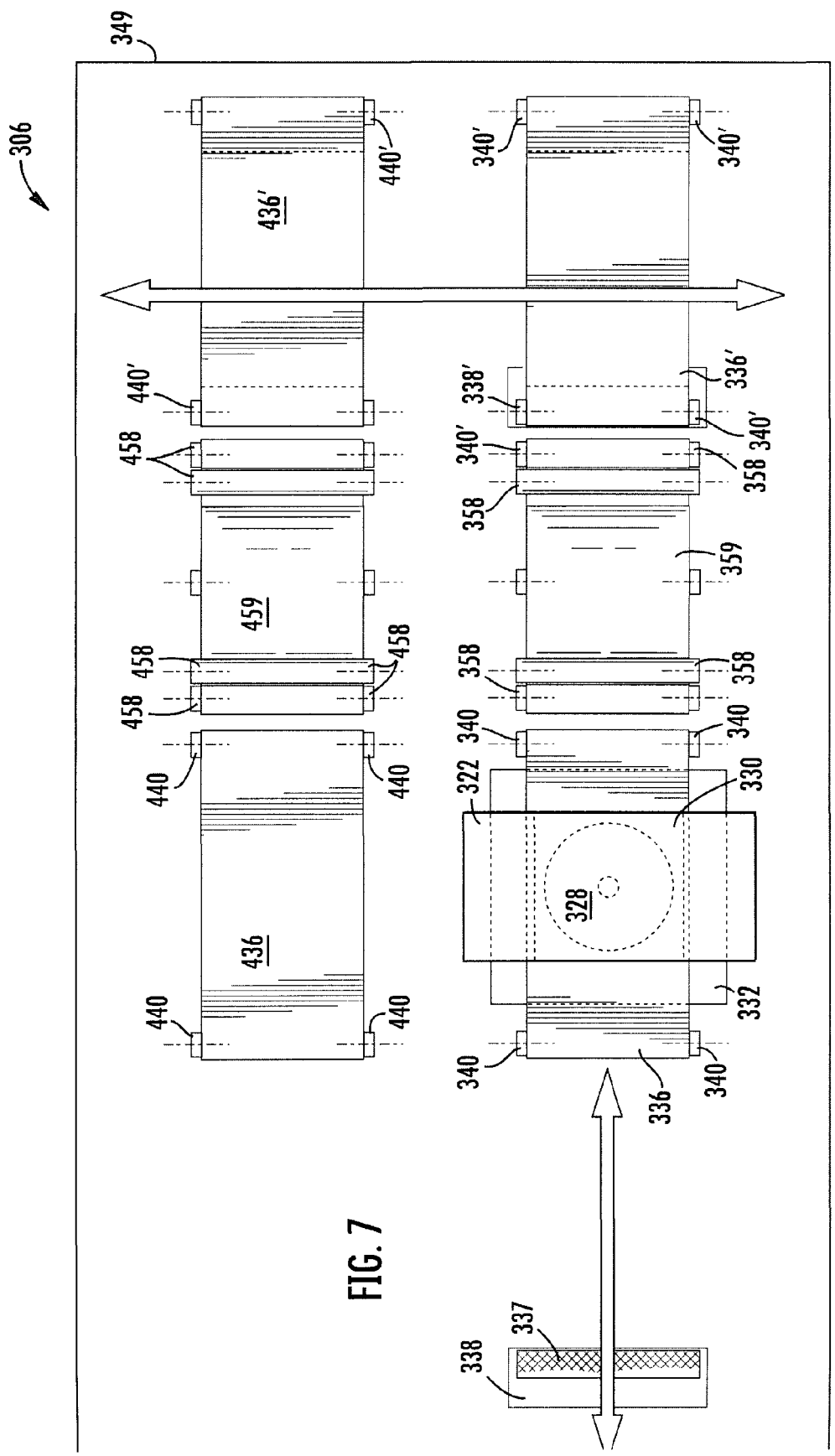
FIG. 7 is a top plan view of another embodiment of the apparatus similar to that of FIG. 4 and having multiple reciprocating carriages in parallel operation.

FIG. 7 is a top plan view of the embodiment of an apparatus shown in FIG. 4, with the addition of a second apparatus in parallel for applying a multiplicity of build materials to a single build. The apparatus has first and second reciprocating carriages in parallel. The carriages are generally the same as that of FIG. 4, only one of which is disposed over the build platform at one time. The entire assembly of first and second carriages reciprocates perpendicular to the reciprocation of the individual carriage over the build platform and pad to place first one reciprocating carriage and then a second carriage in the image plane over the build platform and pad, as indicated by the directional arrows.

First and second reciprocating carriages have two coating belts 336, 336' and 436, 436,' respectively, and an uncoating belt 356 and 456, respectively. The arrow indicating left and right motion indicates reciprocation of the first carriage containing belts 336, 356, 336' over the build platform 332. The second carriage assembly, having belts 436, 456, 436,' is out of service until the coating and uncoating operation of the first carriage assembly is completed. When the first carriage assembly has completed its layers, cured by exposure to radiation source 322, then the first carriage assembly moves in the direction indicated by the vertical arrow to placement out of service and to bring the second carriage assembly into service in alignment with the build platform. After the first carriage assembly has laid down its layers, then, if desired, the second carriage assembly moves in the direction indicated by the vertical arrow to placement out of service and to bring the second carriage assembly into service in alignment with the build pad 330 until the build 328 is completed.

In operation, the assembly of FIG. 7 is capable of putting down up to four separate build materials. One carriage may be used to provide the supports while another provides the build product. Alternatively, complex structures having layers of various build materials can be created such as are used for biological structures. It should be recognized that by including additional carriages, the embodiment of FIG. 7 can be extended to a third or fourth carriage or even more to increase the number and kind of build materials used in the solid imaging process.

Figure 8:
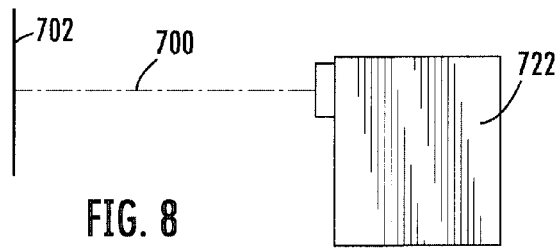
FIG. 8 is a top plan view of an imager.
Figure 9:
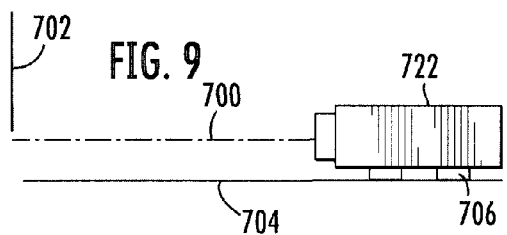
FIG. 9 is a longitudinal plan view of an imager.
Figure 10:
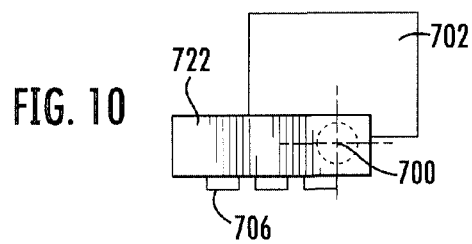
FIG. 10 is a rear plan view of an imager.

FIGS. 8, 9, and 10 depict different views of a conventional digital light processor imager 722 of the kind that can be used as an imager providing focused radiation in the practice of any of the embodiments shown in FIGS. 1A through 7. FIG. 8 shows the imager from a top plan view with the optical axis 700 centered on the image 702 produced by the imager. FIG. 9 shows the imager from a side plan view supported on a surface 704 by pads 706 and demonstrates that the image is offset above the optical axis. FIG. 10 shows the imager from a rear plan view and that the image is offset to the right and above the optical axis.

It should be recognized that a wide variety of solid imaging radiation sources could be adapted for use in the invention to provide focused radiation. For the embodiments using a gravure roll, or for providing focused radiation designed to harden only those portions of a build material layer corresponding to the desired image, the imagers include UV projectors, scanning laser systems as used with stereolithography, LCD's (liquid crystal diodes), LCoS's (liquid crystal on silicon), LED's (light emitting diodes), or DLP (digital light processing) projectors.

In one specific embodiment, the imager is a DLP projector. Commonly available imagers typically are limited to an image area of 1024×768 pixels. Higher resolution imagers with higher micromirror density typically have an image area of 1400×1050 pixels and produce images with dimensions about 37% larger than the smaller imagers.

Commercially available DLP projectors typically require modified optics to display both UV and visible light wavelengths, establish a desired focal length based on the arrangement of the flexible transport solid imaging carriage system, and to adjust the light intensity based on the material used. One such modified DLP projector incorporates a DMD (digital micro-mirror device) array and has a lamp and a nine-element projection lens imaging radiation from the lamp over a spectral range suitable for solid imaging, including from about 350 to 450 nm in focus at a projection distance of 400 mm over an image area of 9×6.75 inches (22.9×17.4 cm). The image is 1024 pixels wide and 768 pixels high. The DLP projector may include a UV/IR filter to remove radiation from the lamp outside the desired spectral range. An illumination lens may be used to uniformly distribute radiation from the lamp across the projection lens. A UV-enhanced light pipe interconnecting the lamp and the illumination lens and UV-enhanced mirrors in radiation-directing communication with the illumination lens and projection lens may also be provided.

Commercial digital light projectors produce images with coarse resolution, as indicated above, because their resolution is limited by the pixel sizes. The 1024×768 pixels in an image generated by commercial digital light projectors limits the size of a three-dimensional object that is able to be built on a support platform because resolution decreases in proportion to an increase in build platform size. The image size in a typical commercial light projector limits resolution in the direction of the x axis to 1024 pixels and to 768 pixels in the direction of the y axis, thereby producing the coarse image. Additionally, commercial light projectors cannot be perfectly focused so that inherent aberrations in each projector result in fuzzy pixels. This "out of focus" condition varies across a pixel image area. Further, there is a different amount of "out of focus" condition for individual projectors. However, utilizing the inherent fuzziness of pixels and employing gray scale exposure levels for each boundary pixel to vary the level of light intensity during exposure of a photocurable solidifiable build material, such as a liquid resin formulation, permits the gray scale value of a projected boundary pixel to control the polymerization boundary of the solidifiable photopolymer build material. The object can be formed in that pixel in a single exposure to achieve much greater build object accuracy and wall smoothness of the solid image or three-dimensional part being built. Being thus able to control the polymerization boundary of the solidifiable build material corresponding to a projected boundary pixel or multiple pixels in the x and y planes, the aforementioned 10.24 inch by 7.68 inch area would look like it had a substantially greater effective resolution than merely 100 dpi. Larger build platforms can also be utilized and larger objects can be fabricated.

A digital light projector controls a set of very small mirrors to reflect light into related pixels. By controlling the reflecting or illumination time, the light intensity K of each projected pixel in the image plane can vary from 0 (black) to 1 (white) with different gray scale levels from 0 to 255. One suitable range of gray scale levels is from about 60 to about 255. Another suitable range of gray scale levels is from about 100 to about 255.

The inherent characteristic of commercial digital light projectors that the pixels in an image are fuzzy or have slight image blurring results in the light intensity overlapping neighboring pixels. This light intensity distribution can be approximated as a Gaussian distribution for purposes of further explanation, but in actuality the light distribution can take many different forms. The light intensity K at a point (x, y) is actually the sum of the light intensity contributions of all the neighboring pixels to the point (x, y). The light intensity at point (x,y) is the blended result of all of the light intensities of point (x, y)'s neighboring pixels. The light intensity of a pixel decreases the further it is away from the center of the pixel. By adjusting the optical system of a digital light projector to obtain some image blurring of the pixels, the light intensity of a pixel is spread to all of its neighboring pixels. Where the point is in a boundary pixel forming the edge or wall of an object, there will be fewer neighboring pixels: 3 neighboring pixels for a point located in a corner wall pixel and 5 neighboring pixels for a point located in an edge or wall pixel apart from a corner.

Controlling the exposure of an image area can be achieved by controlling certain exposure parameters. Energy delivered to a target substrate by a radiation source can be expressed by the relationship, Exposure=Intensity of the radiation x Time of exposure. This relationship is utilized in controlling exposure parameters. One parameter is controlling the illumination time of each pixel within the plane that constitutes the cross-section of a three-dimensional object being built. Alternatively, another parameter to control the level of exposure can be varying the light intensity levels, for example by varying the gray scale levels while holding the exposure time constant for all boundary pixels. A third parameter is varying the width of the light intensity of the projected pixels. This can be achieved by varying the degree of focus of the projected pixels. This parameter can vary at different locations across the image area. All three techniques can be employed separately, jointly in different combinations, or jointly all at the same time. An individual projector can be characterized for its pixel intensity width in both the x and y planes as a function of the pixel location by measuring the projected intensity with a digital camera at selected pixels in the image area. This information can then be stored in the solid imaging apparatus to be employed to obtain optimal image performance across the image plane and accurate control of the polymerization boundary in the object being formed. A fourth additional parameter that may be controlled is the light intensity versus the age of the lamp in the projector. Since a lamp's intensity, and therefore the amount of light energy delivered, decreases with time, the aging effect of the lamp on the amount of energy delivered must be compensated for by increasing the exposure time of the lamp to have the same number of photons be delivered to the projected pixels over time. Intensity is routinely measured with a radiometer. Since each solidifiable photopolymer build material has its own particular characteristics, such as photospeed, that affect polymerization, these four parameters are calibrated to the particular solidifiable photopolymerizable build material selected.

Calibration is achieved by adjusting the different light intensities for the pixel at point (x, y) and its eight neighboring pixels so that the desired accumulated light intensity K is sufficient to solidify the solidifiable photopolymer build material at that point based on the time of illumination of each pixel in the image area forming an object cross-section. When the accumulated light intensity K equals or exceeds the critical energy Ec needed to solidify the solidifiable photopolymer build material, such as a liquid resin formulation, that build material will solidify and add to the geometry of the object being formed. Where the accumulated light intensity is less than the critical energy Ec, the build material will remain in the non-solidified or liquid state.

For a typical resin the critical energy Ec is much less that the energy used to expose the body of the layer within the boundary, perhaps 20% or less. The Ec for typical resins employed in apparatus of the invention is normally about 10 to 12% of the layer exposure energy employed. The width of the region that is solidified varies according to the light intensity of the edge pixel. Since the light intensity from a pixel varies with gray scale, the polymerization of the solidifiable build material forming the edge or border of a region can be controlled by varying the gray scale of the border pixels.

Varying exposure intensity levels and pixel intensity width or the degree of projected pixel focus creates slight image blurring and affects the amount of light energy delivered to boundary pixels to control the polymerization boundary of the solidifiable photopolymer build material to thereby define the effective location of the edge or boundary of a feature in a boundary pixel of an object with sub-pixel resolution. Varying the intensity exposure levels is achieved by varying the illumination or exposure time and/or the gray scale exposure levels. This technique achieves much higher image boundary resolution than is present in just the pixel resolution.

It should be noted that a projected image is a two-dimensional image with edges in the x and y directions. When a three-dimensional object is fabricated by layering multiple cross-sectional layers, the fabricated object extends in the z direction, or the third dimension. The invention achieves edge smoothness in the projected image in individual two-dimensional cross-sectional image projections. When each individual two-dimensional cross-sectional image projection polymerizes the solidifiable photopolymer build material, a solid layer is formed corresponding to the exposed projected pixel areas on the solidifiable photopolymer build material. Adhering or summing superimposed multiple cross-sectional layers one to another in a build process, the present invention forms a three-dimensional object with smooth walls that are formed from the plurality of adhered smooth edges in the individual cross-sectional layers.

In operation, digital data for the three dimensional object to be built is sent to the solid imaging system. This is preferably from a CAD station (not shown) that converts the CAD data to a suitable digital layer data format and feeds it to a computer control system or host computer (also not shown) where the object data is manipulated to optimize the data via an algorithm to provide on/off instructions for the digital light projector. Alternatively, this digital data can be received by the solid imaging systems by digitizing a physical part or from pattern files. The solid imaging layer data attained by the CAD data or by digitizing a physical part or sometimes from pattern fills is preferably processed by the host computer utilizing a slicing program to create cross-sectional data representative of the cross-sectional layers of the object to be built. The solid imaging layer data obtained from pattern data is sometimes not sliced, but patterns are directly utilized as bit-map cross-sections. These steps of the present invention are conducted in the same fashion as in standard stereolithography processes. The slice data obtained from the slicing program is converted into bit map data. Using a gray scale software program, the host computer calculates the gray scale exposure levels required to control the polymerization boundary of the solidifiable photopolymer build material when the build material is exposed. A microprocessor controller or computer in the solid imaging apparatus receives the bit map input of the object to be formed. An algorithm is then applied to the bit mapped cross-sectional data by the controller or computer in the solid imaging apparatus to create the instructions for a controller, such as a microchip, in the digital light projector. The digital light projector has previously been characterized for its focus of the projected light pixels by observing the degree of focus of pixels across the image area (or plane). The projector has also been characterized for its light intensity distribution by the use of a radiometer to record light intensity at selected pixel locations on the image area and the focus and illumination time have been adjusted as needed. The illumination time is adjusted based on the light intensity, age of the lamp in the digital light projector, and the particular solidifiable photopolymer build material to be utilized. A radiation transparent build material carrier delivers the solidifiable photopolymer build material from a supply reservoir or cartridge to the imaging area. The imaging area is supported by the support platform that is movably mounted to the frame of the solid imaging apparatus to extend and retract the support platform on which the solidifiable photopolymer build material is polymerized and formed into a three-dimensional object. The digital light projector illuminates selected pixels in the desired illumination pattern at desired exposure levels in the image area within the boundary of the three-dimensional object by projecting an image representative of the bit mapped cross-sectional data in the cross-section being formed. The desired exposure levels are obtained by having characterized the digital light projector for one or more of the previously discussed exposure parameters and adjusted the exposure levels as needed in response to the characterization. The desired exposure levels from the digital light projector in the image area permit the projected image to selectively solidify the photopolymer build material and control the polymerization boundary of the photopolymer build material in the projected pixilated image through the application of different exposure parameters to different areas of the image plane. The build platform is then moved out of contact with the radiation transparent build material carrier to prepare for the receipt of fresh or uncured solidifiable photopolymer build material prior to the next exposure. The steps of delivering the solidifiable photopolymer build material, illuminating the image area on the support platform and repositioning the support platform to receive a fresh supply of solidifiable photopolymer build material is repeated for each cross-sectional layer until the three-dimensional object is completed.

The algorithm, based on experiential data, selects pixels for a higher gray scale value exposure or illumination that have a larger portion of the object's feature within a particular pixel. Although the amount of photopolymer build material solidified at a boundary will vary for different types of build materials and different digital light projectors, the relationship between the gray scale level and amount of photopolymer build material solidified along a boundary pixel will generally follow the same pattern. The gray scale value K of a pixel is set according to the area of the pixel that is inside the part or feature. The gray scale value K assigned to a pixel is a function of the ratio r [K=f(r)], where r is the area A' of the portion of a pixel that is inside the part or feature to the total area A of the pixel or r=A'/A. However, a gray scale value is needed for boundary pixels and their neighboring pixels since the ratio is 1 for pixels inside the part or feature and 0 for pixels outside. The value of the area of the portion of a boundary pixel that is inside the part or feature is based on super-sampling and approximates the value of the area A' of the portion of a pixel that is inside the part or feature. This super-sampling approach is suitable for use with an image-based slicing algorithm.

The algorithm divides a boundary pixel, through which some portion of the object's feature passes, into a set of sub-pixels Pij in a k×k matrix or subdivision of the sub-pixels Pij. The algorithm then samples each of the sub-pixels Pij at its center to determine if it is covered by some portion of the object's feature. The total area of those sub-pixels Pij covered by or within some portion of the object's features approximates the area A' of the portion of the divided pixel that is inside the object's feature. For a pixel having k×k subdivisions, the ratio r can be expressed as the sum of the total area of the sub-pixels Pij covered by or within some portion of the object's features divided by k×k subdivisions, or r=ΣPij (covered)
k×k Using this approach, the boundary resolution of an object built is determined by the number of subdivisions described above forming the k×k matrix or subdivision. For example, a 4×4 matrix will have 16 different gray scale values and the boundary resolution determined by Pixel Size/4. Similarly, for an 8×8 matrix there will be 64 different gray scale values and the boundary resolution determined by Pixel Size/8.

An alternative algorithmic approach to the super-sampling technique just discussed for instructing which pixels for the projector to illuminate can be based on boundary area calculations. The area calculations within the boundaries of the projected object or feature within each pixel use the actual or closely approximated boundary segments to create distinct geometric shapes within the boundaries of each pixel. The algorithm will calculate the exact or approximate areas of each geometric shape to be illuminated within the boundary segment or segments passing through each pixel and sum the areas to generate an exact or nearly exact area within the boundary segment or segments of the object or feature being projected in each cross-section of the object.

There still may be visible systematic boundary errors in the form of observable patterns on object boundaries of objects fabricated using the described gray scale exposure levels. Admittedly, these errors will be 1/k times smaller and less visible by using different gray scale exposure levels for the boundary pixels, but they may still be observable upon close inspection. Introducing randomization into the gray scale values at the boundary pixels can produce a fabricated object that does not have any observable patterns on its boundaries. This can be accomplished by adding a random number $\Delta f$ within a given range and assigning $f(r)+\Delta f$ as the pixel's gray scale value or by using a look-up table in which for any given area ratio r, the return value $f(r)$ from the look-up table varies within a given range.

The building area of a solid imaging device, including the flexible transport solid imaging devices of the invention and others, can be increased by increasing the number of imagers. For DLP's and certain other imagers for which the illumination array is a pixel, including liquid crystal diodes ("LCD's"), liquid crystal on silicon ("LCoS's"), light emitting diodes ("LED's"); ultra violet ("UV") projectors' and the like, the invention includes solid imaging in which two or more imagers are aligned for use as an imager assembly for increasing the image area. Each of these imagers can be multiplied in a precisely aligned array to produce larger image areas without increasing minimum feature size or reducing radiation power density.

The imagers are individually characterized prior to the alignment procedure using an array of digital cameras. The intensity distribution of each imager is characterized by using a radiometer probe. One suitable camera array is a 16 camera array arranged with 4 rows of cameras having 4 cameras per row. Suitable cameras include black and white model IV-BWCAM2EX cameras with Euresys Picolo Pro 3 series frame grabbers.

After the individual imagers are characterized, then the set of multiple imagers is characterized using another digital camera array of 9 cameras to align the images produced by the imagers and to measure the pixel blending characteristics along the seams between the image areas. Pixel blending characteristics typically are much different along opposite sides of the seams.

Figure 11:
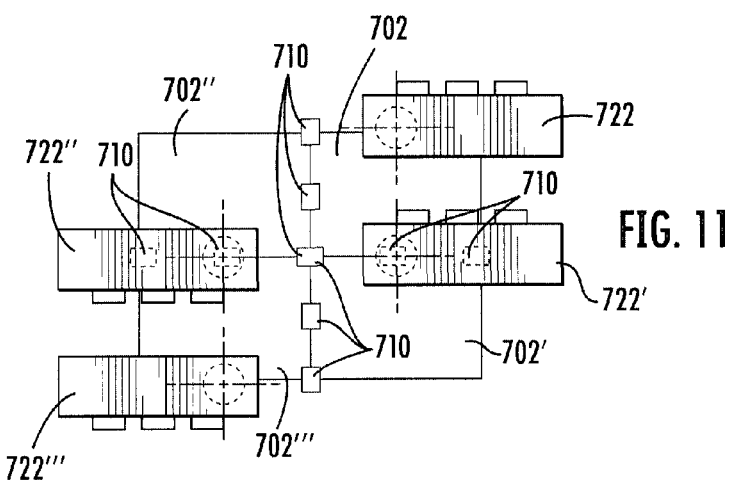
FIG. 11 is a rear plan view of four imagers in an imager array of the invention.

FIG. 11 shows in rear plan view an example of an array of multiple imagers 722, 722', 722", and 722'" aligned for use in solid imaging. The projection area of each imager, designated separately as 702, 702', 702", and 702'" corresponds to a quadrant of the combined projection area. Nine cameras 710 are focused on the seams between the individual imager projection areas to observe the intensity and alignment of the imagers in the imager array.

Figure 12:
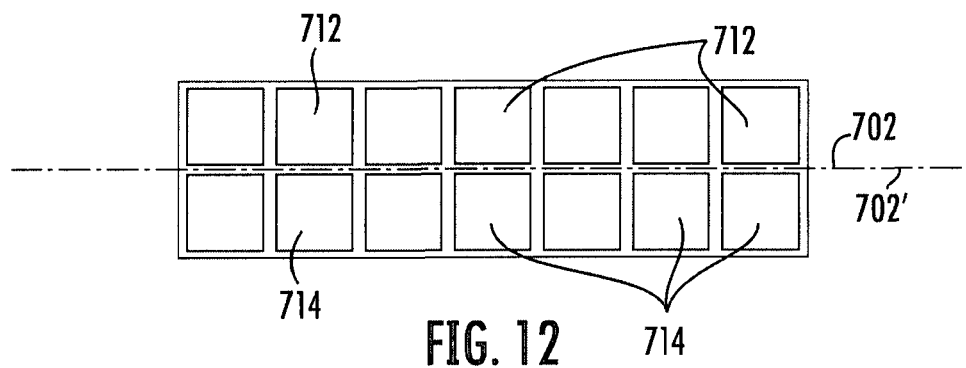
FIG. 12 is a subset of pixels at the boundaries of two imager projection areas with the two imagers aligned in accordance with the invention.
Figure 13:
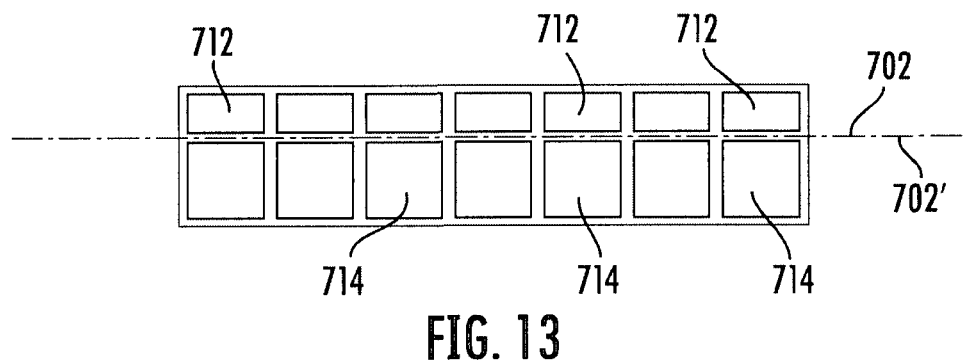
FIG. 13 is a subset of pixels at the boundaries of two imager projection areas with the two imagers overlapping by ½ pixels in accordance with the invention.
Figure 14:
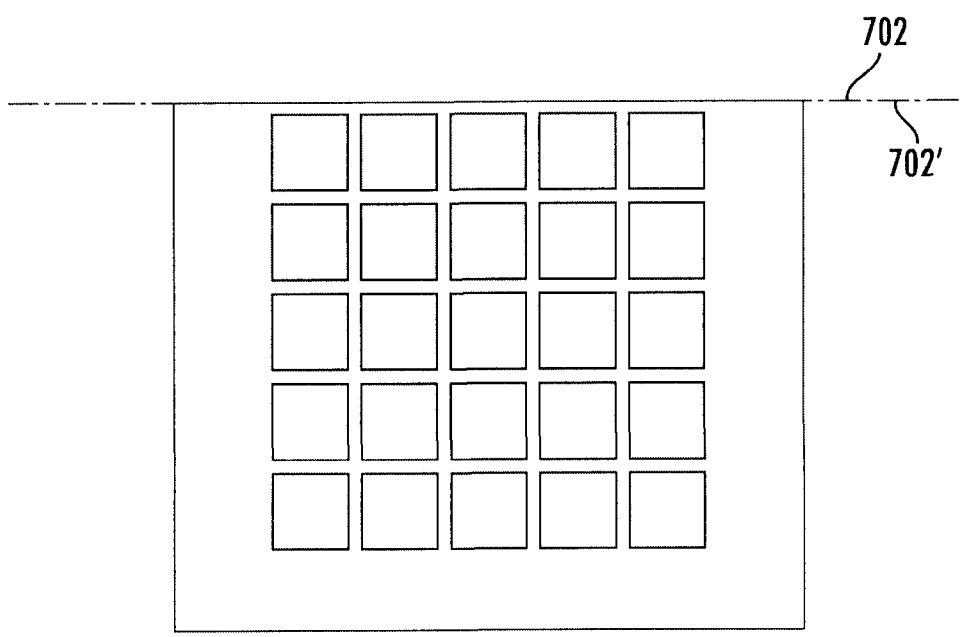
FIG. 14 is a 5 pixel×5 pixel pattern at the seam of an image used to characterize an imager in accordance with the invention.

FIGS. 12, 13, and 14 depict test patterns used to align multiple imagers for use in an imager array. FIG. 12 is a subset of pixels 712, 714 at the boundary of two imager projection areas 702 and 702' with the two imagers 722 and 722' aligned. FIG. 13 is a subset of pixels 712, 714 at the boundary of two imager projection areas 702, 702' with the two imagers overlapping by a ½ pixel. FIG. 14 is a 5 pixel×5 pixel pattern showing the seam 702/702' of an image used to characterize an imager 722'.

Alternatively, the imagers can be aligned by establishing a 2×2 pixel checkerboard test pattern imaged with each imager and viewing the seams with the 9 cameras positioned on the seams. The imager positions are adjusted to obtain the best match of test patterns along each of the seams. Because of pincushion or barrel distortion, it may not be possible to exactly match the patterns, so some overlap of ½ pixel, 1 pixel, or more may be required to insure the imagers cover the entire area of the test pattern with no gaps. Maximum overlap is typically about 1 pixel. The imagers may need to be adjusted to account for variation in intensity between the imagers, which may be measured by a radiometer probe. The magnification of each imager may then be adjusted by moving the imager slightly closer or farther away from the target or by adjusting the zoom lens, and the magnifications are adjusted so that, as closely as possible, the pixels completely line up along the seams.

Next, the blending characteristics of the pixels on the seams are determined. Although the imagers may be capable of producing a wide distribution of light intensities, the solid imaging build material only has two possible states: the material can either be cured or it can be uncured. In addition, the energy on a given pixel is not only imparted by the exposure of that pixel but also by the exposure of neighboring pixels. Accordingly, the solidification of the solid imaging build material at a given pixel location on the image plane is the result of the accumulated exposure of that pixel and its neighbors. Accumulated exposure may be used advantageously to enhance the resolution of the borders of the projected image, which is discussed in U.S. patent application Ser. No. 11/468, 090, filed Aug. 29, 2006 and entitled "Improved Wall Smoothness, Feature Accuracy and Resolution in Projected Images via Exposure Levels in Solid Imaging," the contents of which are incorporated herein by reference in their entirety.

Accumulated exposure has further implications when working with multiple imagers. Specifically, when a portion of the image falls within the overlapping projection area of two or more imagers, exposure levels near a portion of the area to be solidified may be multiplied. In other words, while the exposure level produced by a single imager may not be sufficient to cure the build material at a given area, the exposure of that area by multiple imagers may cumulatively provide enough energy to solidify the build material.

To account for cumulative exposure, this method provides that for each imager at each camera position 710 at the seams, a 5 pixel×5 pixel pattern is imaged as shown in FIG. 14 for seam 702/702'. Sequentially, first the intensities of the outside columns and then the intensities of the outside rows of the patterns are reduced by changing the gray scale over a range from 255 to 0. At each change in gray scale the intensity profile from the camera is recorded. The data from these recorded profiles is manipulated and compared to the threshold exposure for the solidifiable photopolymer build material to be used to determine the relationship between the border position and gray scale.

Different gray scales may be required for two imagers for a given border position that crosses a seam. The gray scale values of the border pixels is calculated and the correct gray scale is applied to correct positions of the borders across the seams. The gray scale versus border position calibration is interpolated between the cameras. If the interpolation is not precise enough, then intermediate camera positions are used or the cameras are moved along the seam, and more data is recorded to improve the precision. As an alternative, the border position could be corrected with exposure time or a combination of exposure time and gray scale.

Exposure rules are established for the cases where pixels overlap. For example, if pixels overlap, then each of the pixel intensities is reduced by half the percentage of overlap with gray scale adjustments (in addition to any gray scale adjustment for the correct border position). There may be a slight imaging artifact remaining on the seam; the visual effect of this artifact can be reduced by adding a small random offset to the border position data every layer. A controller may be provided to control the exposure at the seams and for segmenting the projected image by the imager that produced the image segment.

It should be recognized that a multiplicity of control functions may be provided for automated operation of the apparatus, including the coating and uncoating functions, elevator function, imager function, the embodiments having multiple imagers for increased build size, and others. These controllers are not illustrated and it should be recognized that these control functions will normally be combined into a single controller element.

Figure 15A:
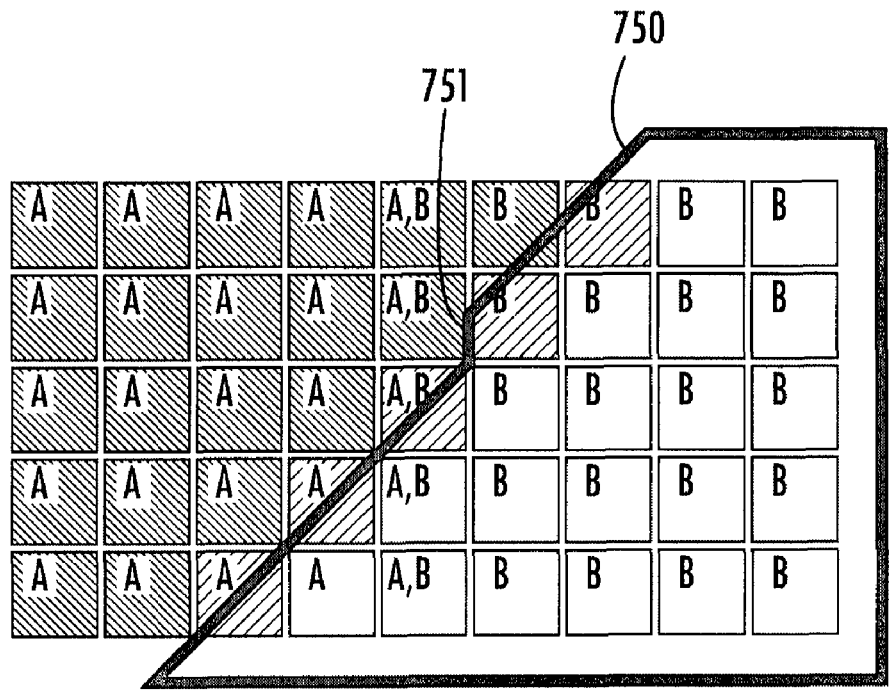
FIG. 15A is sketch of pixels from two aligned imagers, imager A and imager B, illustrating in dark outline the image area created by the imagers, application of gray scale to correctly locate the image area border where imagers A and B overlap, and displacement of the image border between the imagers where the same gray scale setting is used for each imager, imager B displacing the image up at the same gray scale setting as is used for imager A.
Figure 15B:
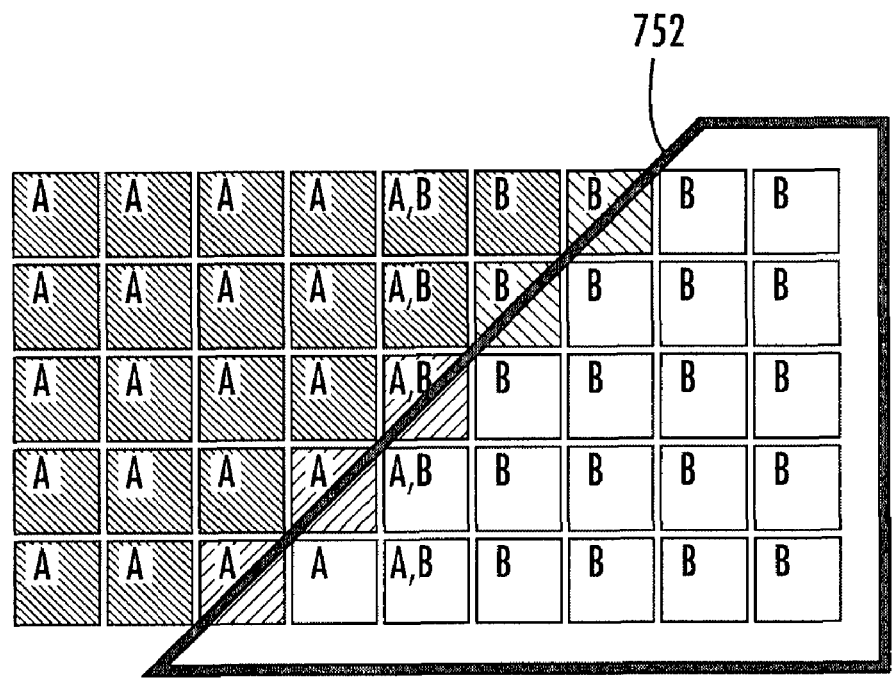
FIG. 15B is a sketch similar to that of FIG. 1A, but illustrating individual characterization of the imagers and individual adjustment of the gray scale setting for each imager correctly to locate the border in the absence of displacing the image.
Figure 15C:
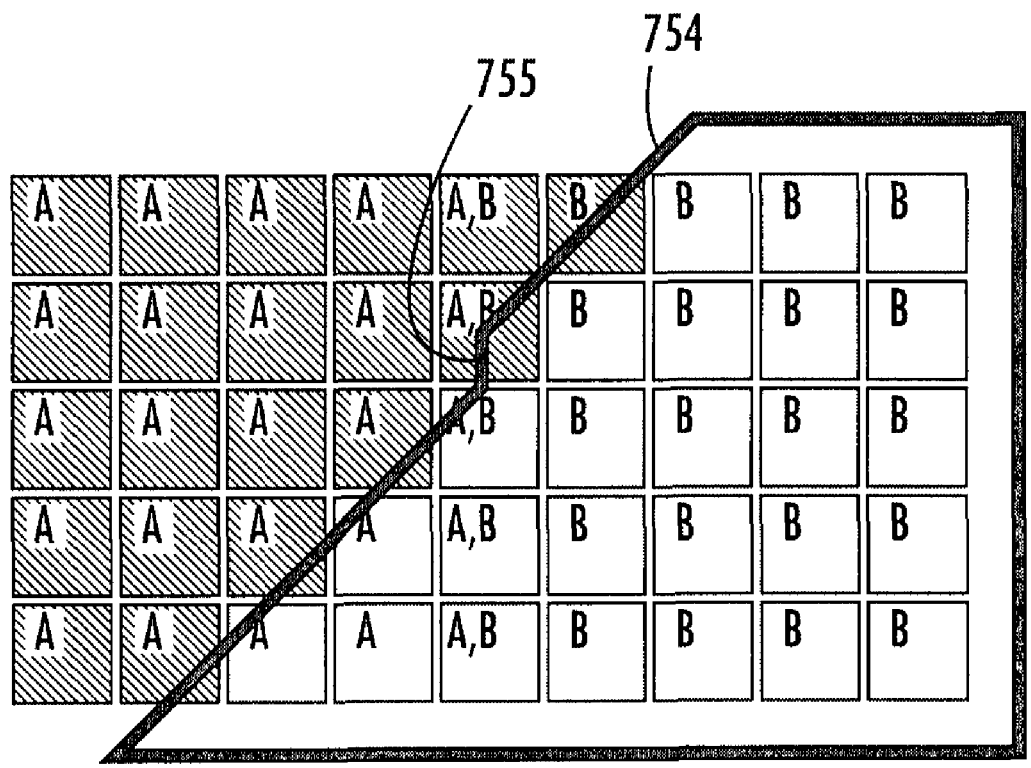
FIG. 15C is a schematic illustration of the prior art in which no gray scale is applied, the pixels are either full on or full off, and the image border where the imagers overlap is displaced both up and to the left.

FIGS. 15A, 15B, and 15C further illustrate the importance of determining the position of an image border for each imager in an imager array where the imagers overlap. The figures show two imagers: imager A on the left and imager B on the right, along a 45 degree border area. The image is shown in these figures in dark outline. Border 750 corresponds to that of FIG. 15A; border 752 to that of FIG. 15B; and border 754 to that of FIG. 15C. The individual squares represent pixels of the imager indicated, each in a 5×5 array, and the imagers overlap along the centrally located pixels by about 1 pixel to create a total array of 9×5 pixels. Shading indicates the degree of illumination of the individual pixel. The unshaded pixels are full on; the heavily shaded pixels are full off; the lightly shaded pixels are in between, neither fully on or fully off.

FIG. 15A illustrates the situation where the gray scale for imager A has been characterized, and that imager A gray scale characterization has been applied to imager B to set the border position. However, no two imagers typically have the same characteristics for a given gray scale for various reasons including the degree of focus and the overall imager intensity. At the gray scale setting chosen that characterizes imager A, imager B tends to displace the image up, which is to say that imager B supplies more light to the pixels at the border position than does imager A. The effect can be seen in the border position at the point 751 where the image crosses from the region of imager A to that of imager B. The image border displaces up in the imager B-only region, which is to say, more build material corresponding to the imager B pixel solidifies since there is more available light (the imager B pixels are more fully on at the imager A gray scale adjustment).

FIG. 15B shows how the application of independent gray scale characterization for each imager in an imager array corrects for the image displacement seen in FIG. 15A. The image border location 752 is matched to each imager so that the border location is known with respect to gray scale. Gray scale adjustments can then be used where the images are stitched together from separate imagers. If imager B is correctly characterized, then the gray scale exposure reduces and matches that of imager A's adjustment. The 45 degree border is correctly located.

FIG. 15C illustrates the prior art in which no gray scale adjustment is made at the border and shows the image of FIG. 15A, which is still displaced up where the image crosses into the more fully on area of imager B at 755, and has also been displaced to the left as a result of no adjustment having been made for the imager A brightness at the edges of the image, even further displacing the imager border from the desired location.

It should be recognized that FIGS. 15A, 15B, and 15C illustrate only a small portion of the typical total area of an image, at a small section of border, for simplicity. Typically, the total illuminated pixel area is much larger and additional steps are taken to ensure an accurate build. For example, the build material may shrink when cured. In these instances it is often useful to image internal portions of large areas in blocks that are allowed to shrink, and then to fill in the small areas between the blocks so as to minimize shrinkage. Thereafter, the borders are imaged as discussed in connection with FIG. 15B to provide an accurate build.

Figure 16A:
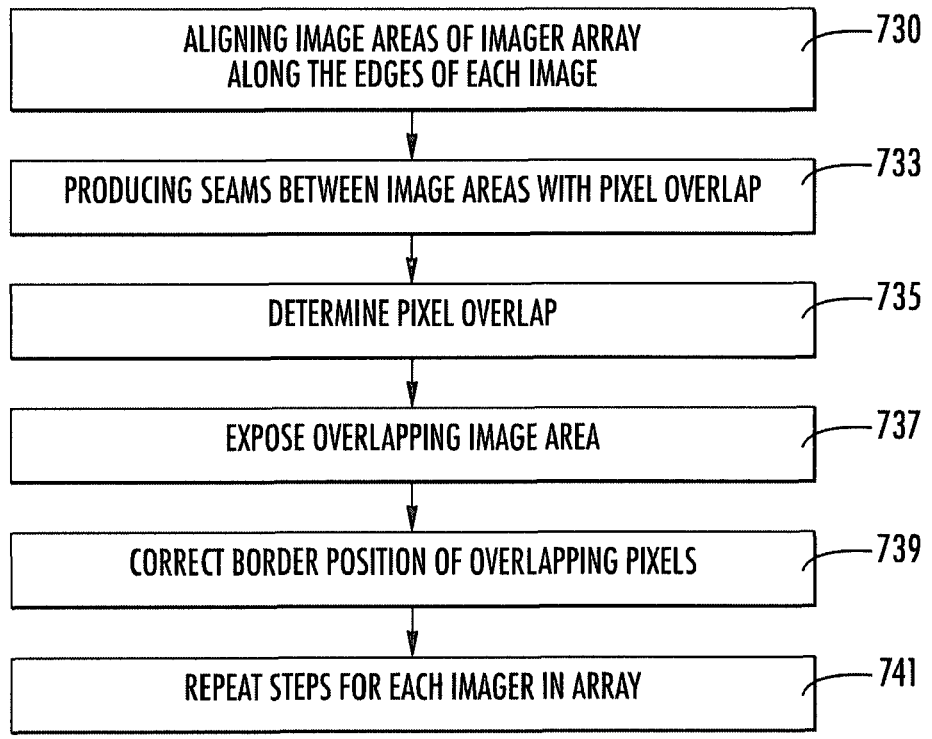
FIG. 16A is a flow diagram illustrating the steps of the method for aligning the imagers.

A summary of the basic steps of the method for aligning the imagers for use in the array is illustrated in FIG. 16A. First, the image areas of each imager in the array are aligned along the edges of each image, in accordance with step 730. To align the imagers, the image areas produced by each imager are imaged on a target divided into areas corresponding to the image from each imager. The position of each imager is precisely adjusted until its image precisely fills its respective target. The imagers are precisely moved until the best match up of the test patterns is achieved along each of the seams, producing seams between image areas with pixel overlap, step 733. The nine cameras are positioned along the seams of adjoining images, and the seams are viewed to precisely determine the amount of overlap, step 735. One of the overlapping imagers at a seam is selected as dominant for exposing the overlapping image area, step 737. The border position of the overlapping pixels is corrected by adjusting the gray scale of the pixels, in accordance with step 739. These steps are repeated for each imager in the array, step 741.

Figure 16B:
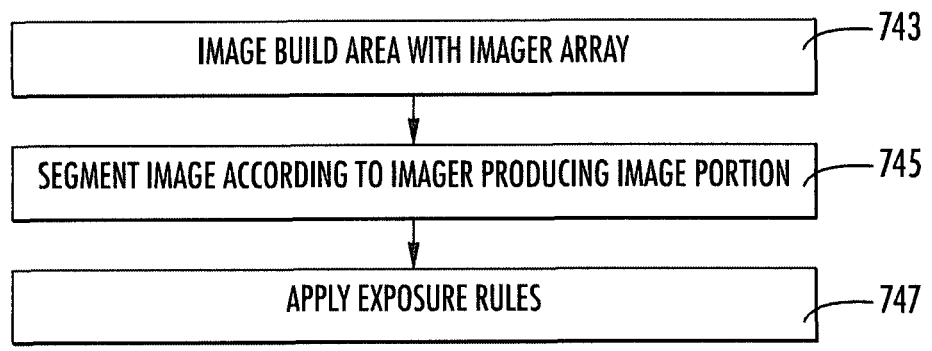
FIG. 16B is a flow diagram illustrating the steps of the method of the invention for imaging a build with an imager array.

After the multiple-imager array is set up for a multi-imager embodiment, the array can be used just like a single imager, with the exception that the imaging software must segment the image according to which imager or imagers produce the portion of the image and then apply the exposure rules for the seams. The steps of the method for using the multiple-imager array in the context of the invention is illustrated in FIG. 16B. First, the build area is imaged with the array of imagers in accordance with step 743. Then, the imaging software segments the image depending on the particular imager that produced the segment, step 745. The software applies exposure rules for the seams that were developed during the alignment procedure, step 747, to complete the method. It should be recognized that the multiple-imager array of the invention can be adapted for use in connection with a conventional stereolithography system in which radiation is used to cure layers of build material from a container of build material one layer at a time.

The embodiments described above, including those modified for use with multiple imagers to increase image area, can all be adapted for semi-continuous operation as described in connection with FIGS. 2, 2A, 2B, 3, and 3A. Semi-continuous operation is useful in a wide variety of areas. Two areas in particular are the production of hearing aids and the production of molds for orthodontic retaining devices, both of which have been accomplished by solid imaging for some time.

Figure 17A:
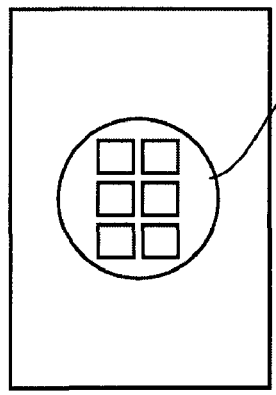
FIGS. 17A, 17B, and 17C are sequence schematic views illustrating image displacement for stitching the seams of multiple imagers in an array, in which a single image illuminates 6 pixels in full in FIG. 17A, and the same image is illuminated shifted in the Y direction in FIG. 17B, resulting in the composite of FIG. 17C in which the pixels of the incremental image layer are shifted in the sub-pixel region by ½ pixel.
Figure 17B:
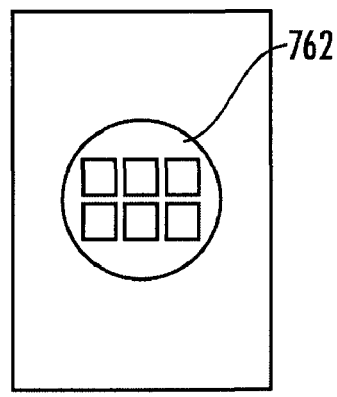
Figure 17C:
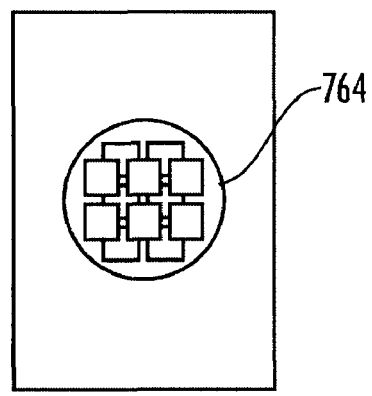

FIGS. 17A, 17B, and 17C illustrate another technique, image displacement, for improving resolution by placing borders at the correct position. However, image displacement may require 8 to 10 shifted border exposures to achieve the smoothness and accuracy of the pixel blending method using gray scale adjustment described above. Image displacement generally is described in copending and commonly owned U.S. patent application Ser. No. 11/096,748 filed Apr. 1, 2005, the contents of which are incorporated by reference herein in their entirety. FIG. 17A illustrates at 760 a 2×3 pixel array from, for example, an imager A, full on. FIG. 17B illustrates at 762 a 2×3 pixel array from, for example, an imager B, the image of which is displaced by one pixel with respect to that of imager A in FIG. 17A. Via multiple border exposures, the result is that of FIG. 17C, illustrating at 764 exposure effectively displaced a subpixel amount, ½ pixel in FIG. 17C.

Figure 18A:
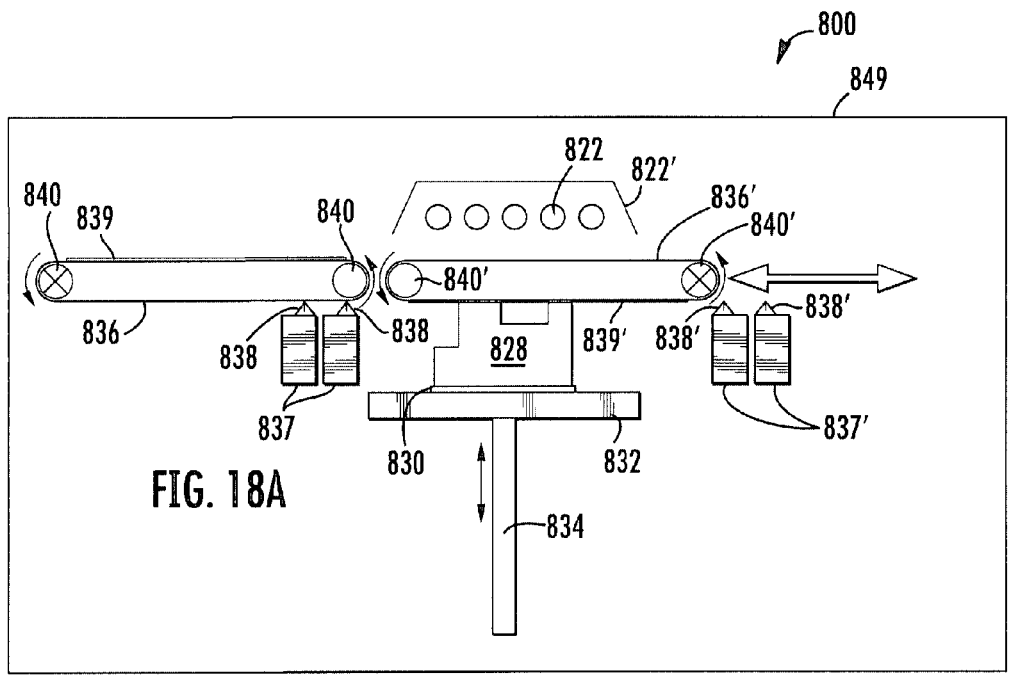
FIGS. 18A and 18B are schematic longitudinal plan views in sequence of yet another embodiment of the apparatus of the invention during an image coating stage of the left-most coating belt and a flood exposure stage of the right-most coating belt.

Turning now to a discussion of embodiments of the invention providing a clean build in the absence of uncoating with a separate belt system, FIG. 18A illustrates another embodiment of the invention that does not use an uncoating belt to produce a clean build. FIG. 18A illustrates ink jet sources 837, 837' of solid imaging build material 839, 839,' all of which can be the same or different materials and which can be used to make a build of multiple build materials, if desired, or to apply a support structure of a different material from the build. The amount of material applied is reasonably uniform across the cross-sectional area and at least enough to make up the height at the cross-sectional layer, and ideally not significantly more than this amount. The inkjet applicators apply a cross-sectional image of jettable solid imaging material to the first coating belt 836 as the coating belt is advanced counterclockwise as shown by the rotational arrows for positioning a layer of coating material on the belt for transfer to the build platform and flash exposure. It should be recognized that the system of FIG. 18A is configured so that as belt 836 is coated, belt 836' is applying its layer of build material to the build surface in the image plane, rotating counterclockwise as the belt encounters the build surface.

Figure 18B:
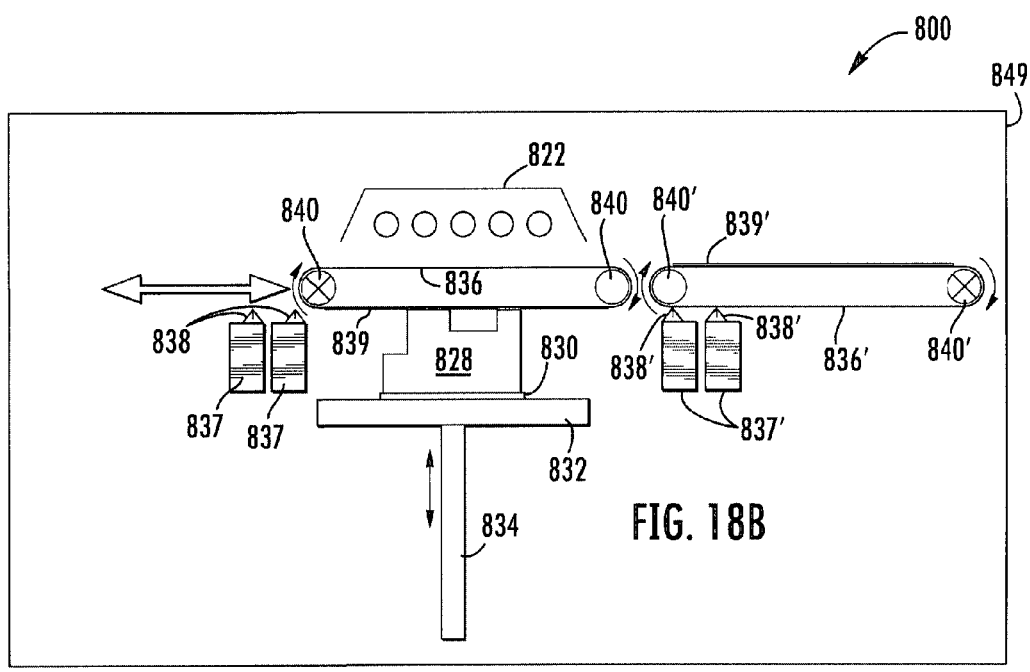

The coating belts travel on a reciprocating carriage as indicated by the horizontal arrows in FIGS. 18A and 18B that moves back and forth to alternately coat each belt and to transfer that coated belt to the build surface in the image plane. As illustrated in FIG. 18B, belt 836 rotates clockwise as shown by the directional arrows to orient the build material on the surface of the build and apply the build material to the build in the image plane. The coating belts, 836, 836' are operated in a reciprocating manner as indicated by the rotational arrows in FIGS. 18A and 18B, similar to that of FIG. 1E, so as to reduce relative motion between the coating layer and the build and reduce the opportunity for entrapping air or damaging the build.

The inkjet system produces in response to a control system (not shown) a solid image build material that is configured on the belts in the image to be solidified on the build. Thus, in this embodiment, the apparatus does not require focused radiation from source 822 to solidify selected portions of the wetted surface of a build. Instead, irradiating the entire image plane from a flash exposure source 822 and reflector 822' with suitable radiation for curing, typically UV radiation from a UV lamp, produces the desired solid image layer in the absence of uncured build material. The embodiment of FIG. 18A requires no uncoating belt.

FIGS. 18C and 18D illustrate sequence views of the extension of the embodiment illustrated in FIGS. 18A and 18B to multiple coating belt configurations. It should be recognized that additional ink jetters could be added to each belt. Additional coating belts 836" and 836'" have been incorporated into the system. Operation is similar to that of FIGS. 18A and 18B, the carriage reciprocating and the belts reciprocating to place each coated belt over the build for imaging the build and for flash exposure of the image.

It should be recognized that the system of FIG. 18A could be operated with a single belt and inkjetter, although typically two or more, as illustrated in FIGS. 18A, 18B, 18C, and 18D will be used for efficiency and versatility, even if using only one build material. It should also be recognized that the systems of FIGS. 18A, 18B, 18C, and 18D, can be ganged similar to that of FIG. 7, with multiple sets of two or more parallel belt systems for multiple materials. The ganged system can also be operated semi-continuously, as described in connection with FIGS. 2, 2A, 2B, 3, and 3A.

Figure 18E:
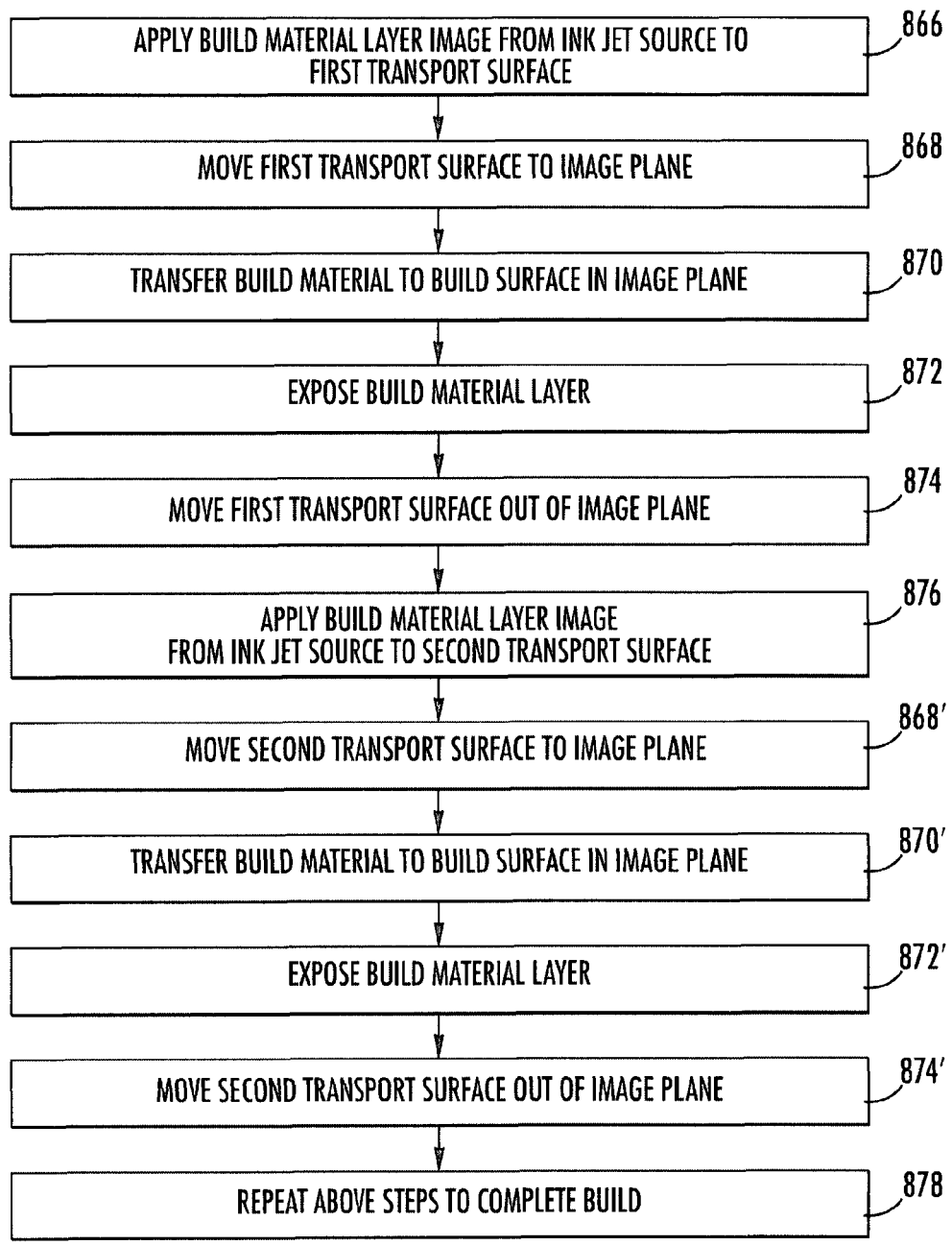
FIG. 18E is a flow diagram illustrating the method steps associated with the embodiments illustrated in FIGS. 18A through 18D.

FIG. 18E illustrates the method steps for operation of the embodiment of FIGS. 18A and 18B. Reciprocating coating belt 836 rotates counterclockwise, which in this embodiment is the same direction as the direction of carriage travel to the left to place the belt over the ink jetter 837, to pick up build material 839 from source 837, all in accordance with step 866. Belt 836 rotates about wheels 840 similar to the manner described above with respect to other embodiments. The carriage shifts right and the belt rotates to clockwise as shown in FIG. 18B to place the belt 836 and build material 839 in the image plane, step 868, and to transfer the build material to the build surface, step 870, with no relative motion so that air is not entrapped and delicate features are not destroyed. Elevator 834 and elevator platform 832 support the build on a build pad 830 in the image plane. Radiation source 822 provides a flash exposure of solid imaging radiation to solidify the layer of build material, and typically will be a UV lamp, in accordance with step 872.

The carriage reciprocates to the left to move belt 836 out of the image plane, step 874 and back into the position shown in FIG. 18A for recoating. It should be recognized that belt 836' operates in the mirror image of belt 836, transferring build material to the image plane while belt 836 picks up build material and picking up build material while belt 836 transfers build material to the image plane. The above steps are repeated for the second belt as indicated by the use of primes, and, finally, the steps are all repeated numerous times to complete a build, step 878.

Figure 19A:
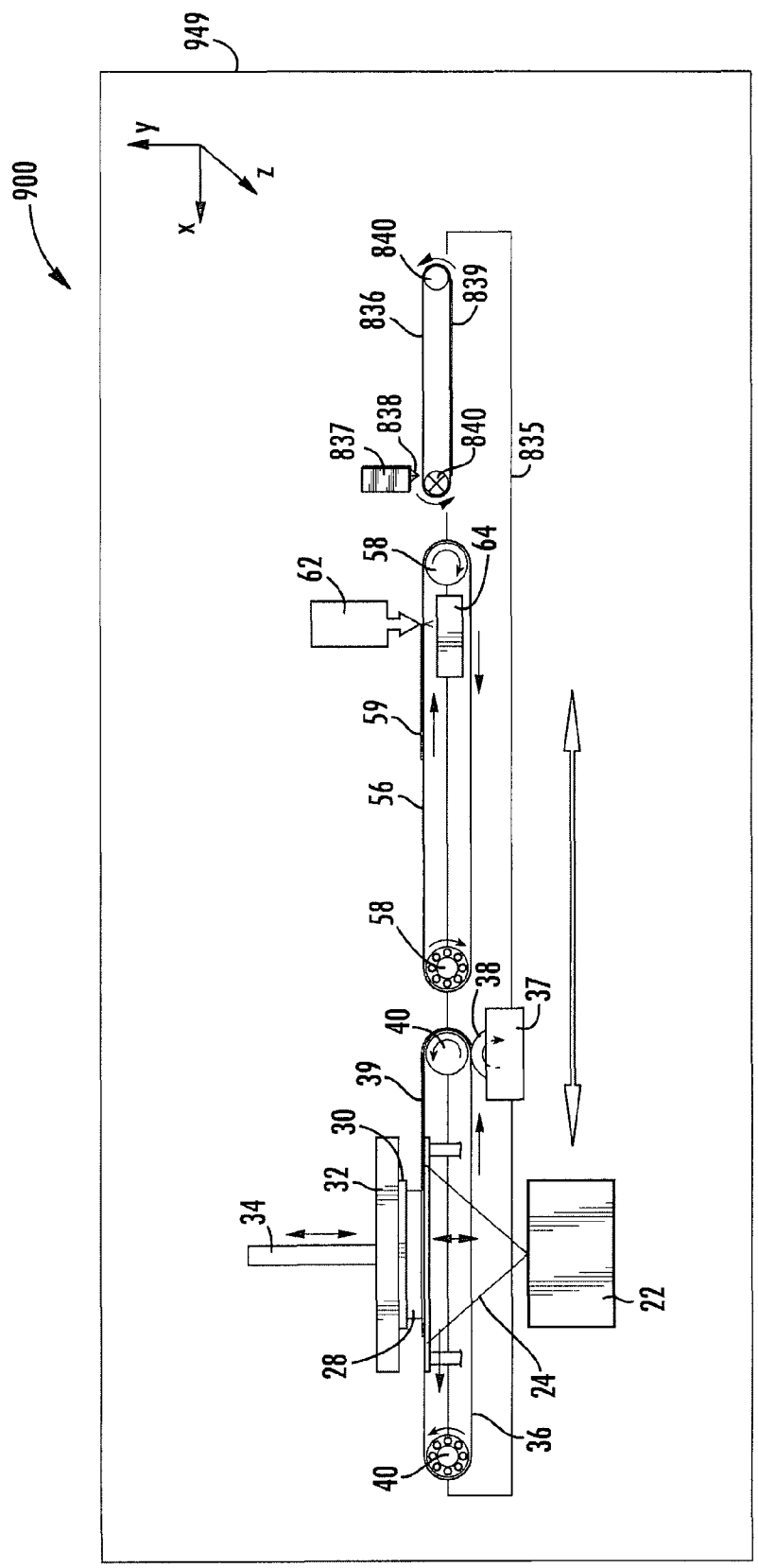
FIGS. 19A and 19B are schematic longitudinal plan views in sequence illustrating an embodiment of the invention that combines features of the embodiments of FIGS. 1F and 1G and FIGS. 18A and 18B.
Figure 19B:
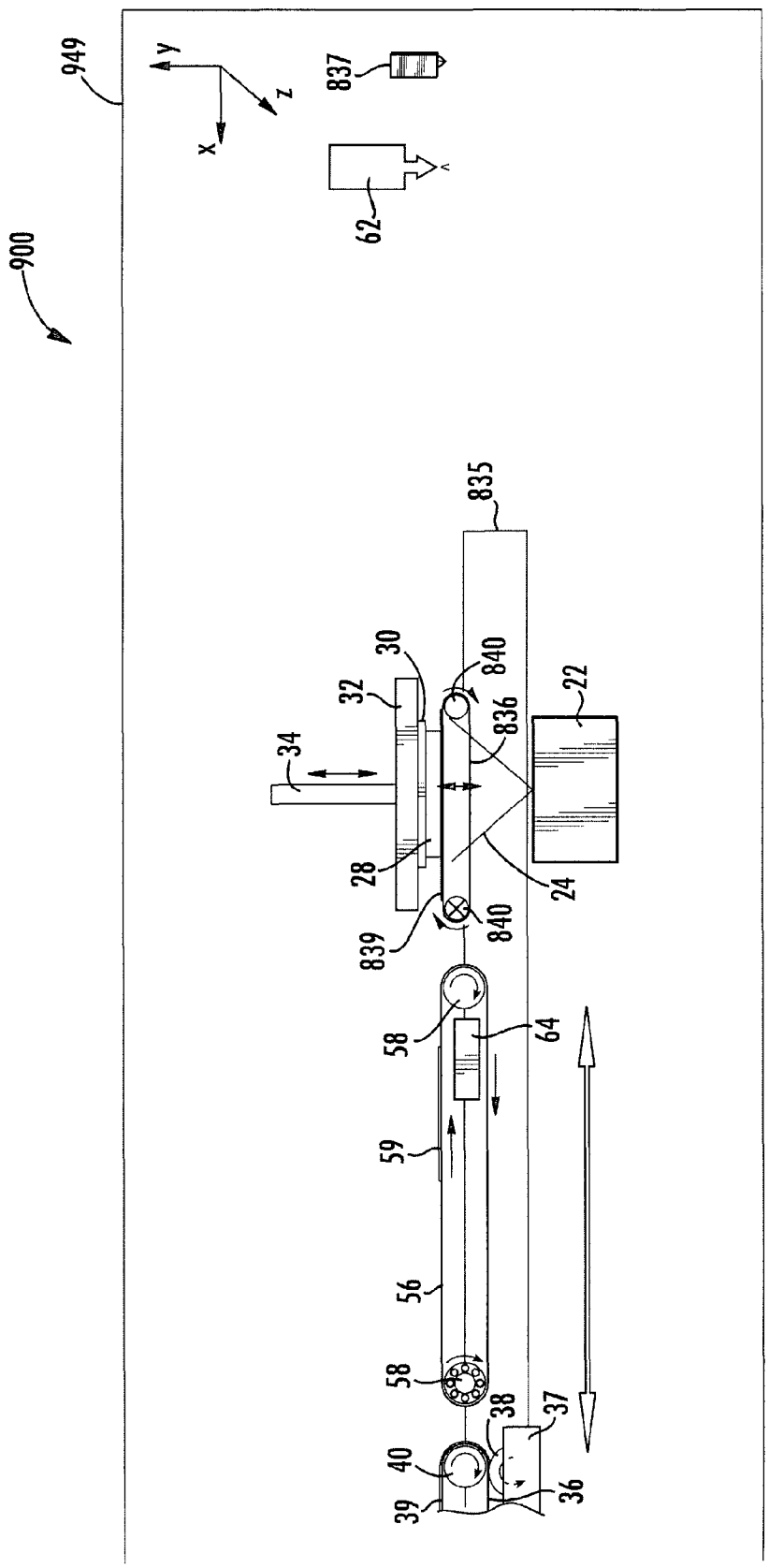

FIGS. 19A, 19B, 20A, and 20B illustrate various combinations of the embodiments discussed above. FIGS. 19A and 19B are sequence views of the apparatus of FIG. 1E to which has been added one of the image coating belts 836 with an ink jet applicator 837 of FIG. 18A. Thus, as illustrated, the embodiments show first and second transport surfaces, which are a coater and uncoater, respectively, and a third transport surface opposite the second from the first, so that the second transport surface is between the first and second. Like parts bear the same numbers and operation is similar. The carriage applies a coating from coating belt 36 to build 28 which is imaged by imager 22. The carriage then moves left to remove excess uncured build material 59 onto uncoating belt 56. Unlike the embodiment of FIG. 1F, the carriage then moves further left to apply coating from inkjet imager 837, which images build material onto the imaging belt 836. The imager 22 is a focusable imager, which focus is immaterial to curing the image provided by the inkjet build material source 837. There is no need to provide a separate flood exposure device since the focusable imager can be operated for flood exposure by having all the pixels illuminated, or even less than all so long as a sufficient illumination flood is provided. It should be recognized that the imaging belt 836 should be at the same height as the coating and uncoating belts 36 and 56, respectively, and that a brush 45 (FIG. 1) could take the place of an uncoating belt 36 or 56.

Figure 20A:
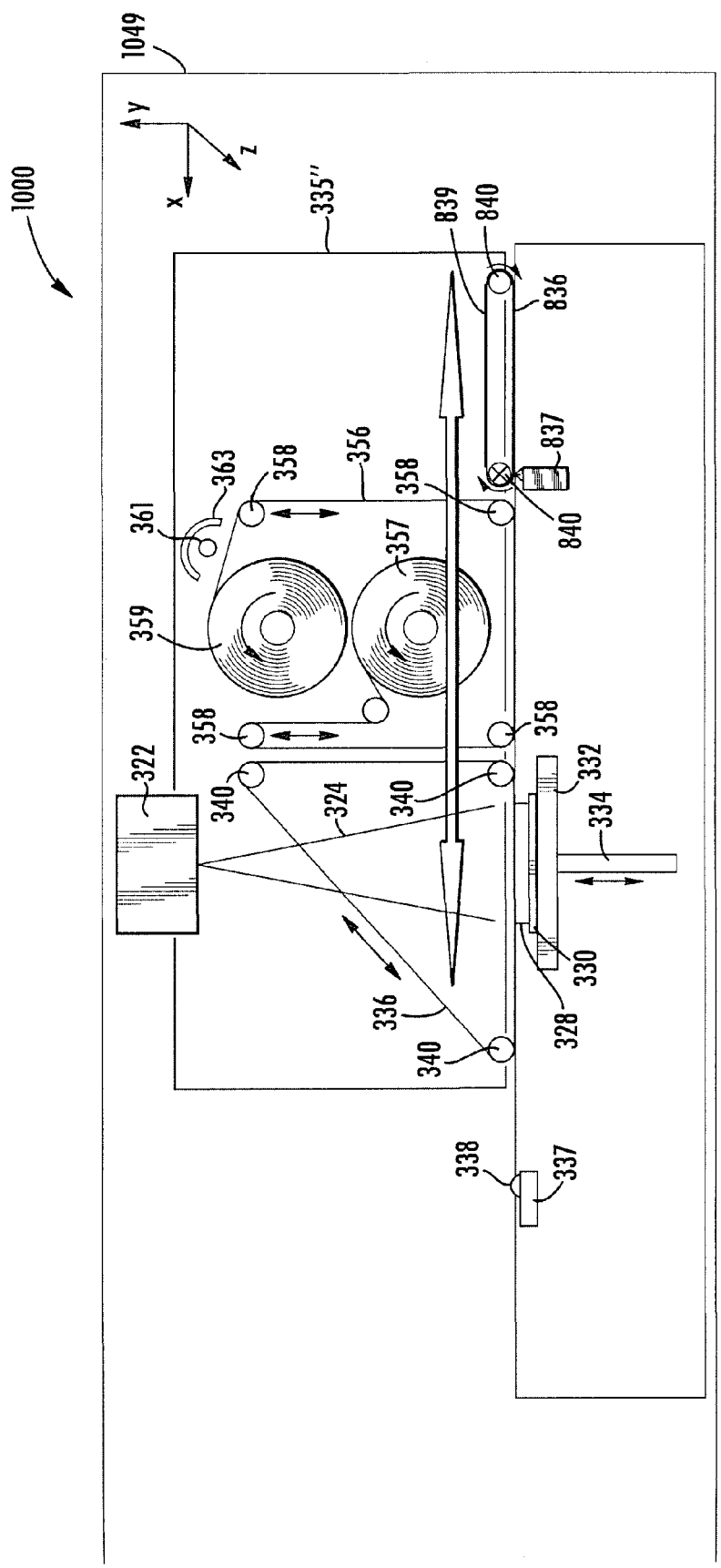
FIGS. 20A and 20B are schematic longitudinal plan views in sequence illustrating an embodiment of the invention that combines features of the embodiments of FIGS. 1F and 1G and FIG. 6.
Figure 20B:
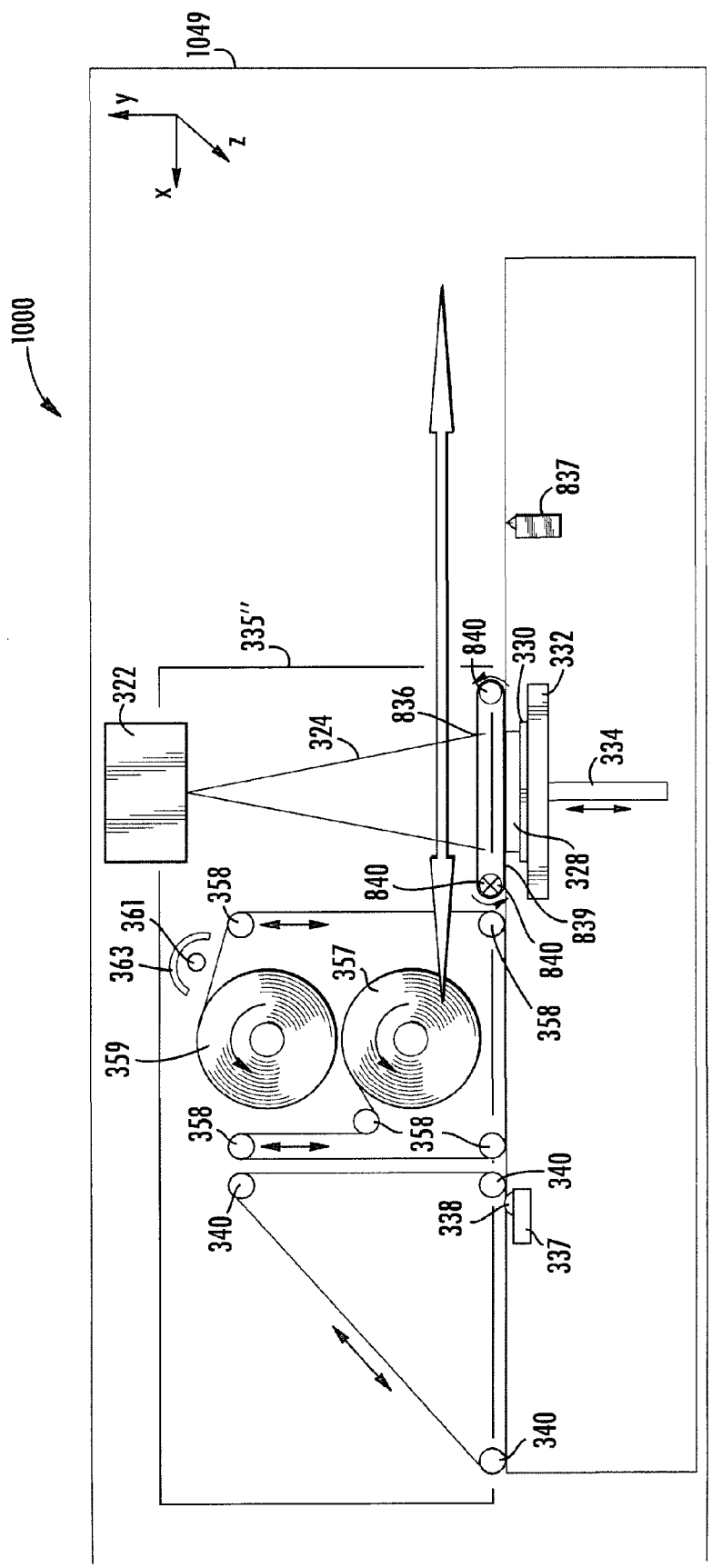

As illustrated, the air knife 62 is stationary and excess uncured build material 59 is not removed from the uncoating belt 56 until the carriage reciprocates the belt back to the air knife. Likewise, the inkjetter 837 is stationary and the imaging belt 836 is coated with the image when the carriage reciprocates the imaging belt back to the inkjetter station. FIGS. 20A and 20B are similar in operation, substituting instead the right most coater of FIG. 4 with the inkjet and image coater of FIG. 18A as in FIG. 19A. It should be recognized that the operation and identification of the embodiment of the coater/uncoater belt combination shown in FIG. 4 applies to FIGS. 20A and 20B as well.

The invention has been described with specific reference to preferred embodiments. However, variations can be made within the spirit and scope of the invention as described in the foregoing specification as defined in the appended claims.

What is claimed is:

1. Solid imaging apparatus for creating a build layer-by-layer, said apparatus comprising:
   a) a defined image plane;
   b) a build pad elevatingly disposed with respect to said defined image plane for supporting a build surface in and out of said image plane;
   c) at least one source of solid imaging build material;
   d) at least one first transport surface for alternately picking up a layer of solid imaging build material from said at least one source and delivering the layer of solid imaging build material to a build surface extending from said build pad;
   e) at least one source of solid imaging radiation for irradiating a two dimensional image on the build surface to which has been transferred the build material from said transport surface, thereby solidifying on the build surface in said image plane a layer of transferred solid imaging build material;
   f) at least one second transport surface for removing excess uncured build material from the build surface after the build surface has been irradiated with solid imaging radiation and before said first transport surface delivers a fresh layer of solid imaging build material to the build surface;
   g) a reciprocating carriage for alternately delivering said first and second transport surfaces to and away from the build surface on said build pad; and
   h) a controller in controlling communication with said apparatus, whereby a build is alternately coated and imaged with layers of solid imaging build material and cleaned of excess uncured build material.

2. The apparatus of claim 1 wherein said at least one second transport surface comprises a brush or a web of absorbent material for contacting the build surface after imaging to remove excess uncured build material.

3. The apparatus of claim 1 wherein said at least one second transport surface is a brush and said apparatus further comprises a housing for said brush mounted to said carriage for reciprocating delivery of said brush to and away from the build surface.

4. The apparatus of claim 1 wherein said at least one second transport surface is an endless reciprocating web of absorbent material and said apparatus further comprises a source of pressurized fluid for removing excess uncured build material from said web.

5. The apparatus of claim 1 wherein said at least one second transport surface is a web of indexable absorbent material for exposing fresh absorbent material for removing excess uncured build material.

6. The apparatus of claim 1 further comprising a heated enclosure containing said defined image plane, build pad, source of solid imaging build material, first and second transport surfaces, source of solid imaging radiation, and reciprocating carriage.

7. The apparatus of claim 1 further comprising an image plane supporting plate transmissive to solid imaging radiation mounted to said carriage and elevatingly disposed adjacent said at least one first transport surface opposite said build pad for pressing the build material layer on said first transport surface onto the build surface.

8. The apparatus of claim 1 wherein said source of solid imaging radiation is a first source thereof and said apparatus further comprises at least one second source of solid imaging radiation for irradiating the build after irradiation by said first source.

9. The apparatus of claim 8 wherein said at least one second source of solid imaging radiation is a UV source.

10. The apparatus of claim 9 wherein said UV source is from 100 to 600 Watts.

11. The apparatus of claim 1 wherein said at least one source of solid imaging radiation comprises UV light and visible light.

12. The apparatus of claim 1 wherein said at least one source of solid imaging radiation is an imager selected from the group consisting of digital light processing (DLP) projectors, light emitting diode (LED) projectors, liquid crystal on silicon (LCOS) projectors, liquid crystal display (LCD) projectors, ultraviolet (UV) projectors, scanning laser systems, and arrays of one or more of these.

13. The apparatus of claim 1 wherein said first transport surface is a reciprocating bilaterally continuous belt.

14. The apparatus of claim 1 wherein said build pad is an indexable surface for providing seriatim fresh build pad areas elevatingly disposed with respect to said defined image plane for supporting a build surface in and out of said image plane.

15. The apparatus of claim 1 further comprising a source of a plurality of discrete build pads for automated replacement of said build pad elevatingly disposed with respect to said defined image plane for supporting a build surface in and out of said image plane.

16. The apparatus of claim 1 wherein said at least one second transport surface is a web of indexable absorbent material for exposing fresh absorbent material for removing excess uncured build material and said apparatus further comprises a source of radiation for solidifying the excess uncured build material on said web.

17. The apparatus of claim 1 wherein said at least one first transport surface comprises a bilaterally continuous belt reciprocatingly engaging the build surface in said image plane in a direction opposite to the direction of said reciprocating carriage, whereby relative motion between the build surface and said at least one first transport surface is reduced.

18. The apparatus of claim 17 further comprising two such first transport surfaces mounted on said reciprocating carriage and at least one source of solid imaging build material for each said first transport surface, said second transport surface for removing excess uncured build material mounted on said carriage between said two such first transport surfaces for seriatim transport of build material from said source by one first transport surface, removal of excess uncured build material by said second transport surface, transport of build material from said source by the other said first transport surface, and removal of excess uncured build material by said second transport surface.

19. The apparatus of claim 18 wherein said reciprocating carriage is a first such reciprocating carriage and said apparatus further comprises second and third reciprocating carriages, said second carriage parallel to said first carriage and having first and second transport surfaces, and said third carriage perpendicular to said first and second carriages and alternatingly delivering said first and second carriages to and away from said defined image plane.

20. The apparatus of claim 1 wherein said at least one source of solid imaging radiation comprises at least two imagers in an array.

21. The apparatus of claim 20 wherein each said imager in said array is a DLP imager individually adjusted with respect to gray scale for determining the same border location between said imagers.

22. The apparatus of claim 20 wherein each said imager in said array is a DLP imager having its image displaced to determine the same border location between said imagers.

23. The apparatus of claim 1 further comprising at least one third transport surface mounted on said reciprocating carriage opposite said second transport surface from said first transport surface and an ink jet source of jettable solid imaging material for said third transport surface.

24. The apparatus of claim 23 wherein said second transport surface is either a reciprocating endless web of absorbent material or an indexable web of absorbent material.

25. The apparatus of claim 8 wherein said at least one second source of solid imaging radiation includes a UV source opposite said build pad from said build and said build pad is transmissive to UV radiation for irradiating the build on said build pad.

* * * * *